US012741887B2

(12) United States Patent
Mackay Pett

(10) Patent No.: US 12,741,887 B2
(45) Date of Patent: Sep. 22, 2026

(54) INTELLIGENT REVERSE OSMOSIS CONTROL

(71) Applicant: Ozono Polaris, S.A. de C.V., Puebla (MX)

(72) Inventor: David Ross Mackay Pett, Puebla (MX)

(73) Assignee: Ozono Polaris, S.A. de C.V., Puebla (MX)

( * ) Notice: Subject to any disclaimer, the term of this patent is extended or adjusted under 35 U.S.C. 154(b) by 0 days.

(21) Appl. No.: 19/393,194

(22) Filed: Nov. 18, 2025

(65) Prior Publication Data

US 2026/0078021 A1 Mar. 19, 2026

Related U.S. Application Data

(63) Continuation of application No. PCT/IB2023/055135, filed on May 18, 2023.

(51) Int. Cl.
*B01D 61/12* (2006.01)
*B01D 61/02* (2006.01)
(Continued)

(52) U.S. Cl.
CPC ............ *C02F 1/008* (2013.01); *B01D 61/026* (2022.08); *B01D 61/12* (2013.01); *C02F 1/441* (2013.01); *G06N 20/00* (2019.01); *G06Q 10/063* (2013.01); *G06Q 10/20* (2013.01); *G06Q 30/0241* (2013.01); *G06Q 50/06* (2013.01);
(Continued)

(58) Field of Classification Search
CPC ...... A61M 1/168; A61M 1/1686; A61M 1/28; A61M 1/282; A61M 2205/3368; B01D 61/026; B01D 61/12; B01D 2317/027; C02F 1/008; C02F 1/441; C02F 2209/03; C02F 2301/04; C02F 2301/08;
(Continued)

(56) References Cited

U.S. PATENT DOCUMENTS

2011/0147285 A1 6/2011 Bonnelye et al.
2016/0046503 A1 2/2016 Hoek et al.
2018/0297867 A1 10/2018 Fleckner et al.

FOREIGN PATENT DOCUMENTS

WO WO 2021/243458 A1 * 12/2021

* cited by examiner

*Primary Examiner* — John Kim
(74) *Attorney, Agent, or Firm* — Heslin Rothenberg Farley & Mesiti P.C.

(57) ABSTRACT

Computer-implemented methods and systems for intelligently controlling a reverse osmosis (RO) machine. The method (which can be executed by a system) can include a processor(s) determining variables related to operation of the membranes of an RO machine by measuring, over time, operating limits of the membranes. The processor(s) can iteratively determine variables (e.g., measured and inferred) related to operation of the membranes by applying an iterative mathematical model to determine a portion of the inferred variables. The portion includes one or more critical variables that cannot be measured directly. The processor(s) determines, based on the variables, an upper limit and a lower limit for various control parameters within the RO machine; control parameters are controlled by active components of the RO machine. The processor(s) derives, for each of the various control parameters, an adjustment. Implementing the adjustment obtains optimal permeate recovery in the RO machine within the operating limits.

16 Claims, 11 Drawing Sheets

(51) Int. Cl.

| | |
|---|---|
| ***C02F 1/00*** | (2023.01) |
| ***C02F 1/44*** | (2023.01) |
| ***G06N 20/00*** | (2019.01) |
| ***G06N 20/10*** | (2019.01) |
| ***G06Q 10/063*** | (2023.01) |
| ***G06Q 10/20*** | (2023.01) |
| ***G06Q 30/0241*** | (2023.01) |
| ***G06Q 50/06*** | (2024.01) |
| ***G06Q 50/10*** | (2012.01) |

(52) U.S. Cl.
CPC ....... *G06Q 50/10* (2013.01); *B01D 2317/027* (2013.01); *C02F 2209/03* (2013.01); *C02F 2301/04* (2013.01); *C02F 2301/08* (2013.01)

(58) Field of Classification Search
CPC .. G06Q 10/063; G06Q 10/20; G06Q 30/0241; G06Q 50/06; G06Q 50/10; G06N 20/00
See application file for complete search history.

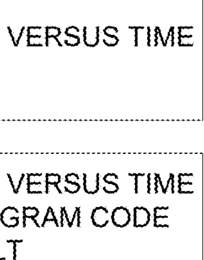

800

810 PROGRAM CODE DETECTS SUDDEN CHANGES IN THE SLOPE VERSUS TIME OF CRITICAL OPERATING PARAMETERS

820 PROGRAM CODE DETECTS SUDDEN CHANGES IN THE SLOPE VERSUS TIME OF CRITICALBASED ON DETECTING THE CHANGE, THE PROGRAM CODE WARNS THE OPERATOR OF AN OPERATING FAULT

830 PROGRAM CODE COMPENSATES (INCLUDING SIMULTANEOUSLY WITH ALERTING THE OPERATOR) FOR THE DETECTED CHANGE BY REDUCING PERMEATE PRODUCTION OR RECOVERY TO PRESERVE THE INTEGRITY OF THE MACHINE AND ITS COMPONENTS

FIG. 8

INTELLIGENT REVERSE OSMOSIS CONTROL

CROSS-REFERENCE TO RELATED-APPLICATION

This application is a continuation of, and claims the benefit of, International Patent Application PCT/IB2023/055135, entitled "INTELLIGENT REVERSE OSMOSIS CONTROL," filed May 18, 2023, which is hereby incorporated by reference in its entirety for all purposes.

BACKGROUND OF INVENTION

Reverse osmosis (RO) systems (which can be referred to as RO machines), which include water purification systems, can be used to purify water. The purified water can be used for drinking water, fabricating silicon wafers and various other applications. RO systems include RO membranes that remove impurities from the water. RO systems can include a booster pump that pushes the water through the membrane and a number of prefilters to remove sediments and other impurities. The system can then store the purified water in a holding tank or pressurized accumulator for subsequent use.

RO membranes operate by separating feedwater into two flows, concentrate which is high in total dissolved solids (TDS) and permeate which is low in TDS. An RO system may have more than one stage, where concentrate from the first stage is the feedwater for the second stage, and so on. Most RO machines are two-stage. Each stage typically includes several tubular pressure vessels operating in parallel, each containing several membranes operating in series. Typically, half the feedwater is recovered as permeate in each stage and the other half carries forward to the next stage, so that a single stage machine recovers about 50%, a two-stage machine recovers about 75%, and a three-stage machine recovers about 87.5%. These percentages can be increased by circulating concentrate to a feedwater inlet.

As the feedwater progresses from membrane to membrane and stage to stage, the TDS becomes more concentrated, and solids may start to precipitate. As purified water permeates through the membranes, a concentration gradient is established, with TDS more concentrated near the surface of the membrane than in the bulk flow of feedwater, which further contributes to the risk of precipitation and possible fouling of the membranes. To avoid this damage to the membranes, membrane manufacturers establish operating limits on concentrate flow, permeate flow, and recovery percentage. To protect the membranes mechanically, there are limits on feedwater flow, operating pressure, and hydraulic pressure drop on the concentrate side of the membrane.

The aforementioned operating limits make the control of RO systems complicated, requiring well-trained operators to avoid rapid damage to the membranes while optimizing operating conditions for economical production of purified water. For example, to maximize productivity, RO systems usually operate at close to maximum capacity, within the predefined operating limits. But during periods of low product water demand, the machine is shut down when the product storage tank is full. While shut down, microbial growth on the membranes may get out of control and cause biological fouling. Optimal operation is also affected by the temperature and TDS of the feedwater which will vary over time.

Optimizing operation of RO systems includes balancing various considerations. The power required by the high-pressure feed pump is one economic consideration, but another important consideration is the water effectively wasted as concentrate (brine) effluent. There is cost associated with pumping and pretreating the feedwater and an additional cost for disposing of the brine. In existing systems, a skilled operator must periodically adjust for these variables.

SUMMARY OF INVENTION

Shortcomings of the prior art are overcome and advantages are provided through the provision of a system for intelligently controlling a reverse osmosis (RO) machine. The system can include an RO machine and a computer system communicatively coupled to the RO machine. The RO machine can include: one or more successive stages wherein each stage may comprise a plurality of membranes, wherein the plurality of membranes at each stage collectively comprise the membranes of the RO machine, one or more pumps preceding at least the first stage, wherein the one or more pumps move feedwater, concentrate or permeate from an inlet to a stage or from each earlier stage to a later stage of the one or more successive stages, valves fluidically coupled to a portion of the plurality of membranes of each stage, the valves controlling various controls within the RO system, the inlet for the feedwater, and outlets for the concentrate and the permeate, produced by the RO machine from the feedwater. The computer system can include a memory, one or more sensors dispersed throughout the RO machine, a portion of the sensors comprising one or more measurement devices, and one or more processors in communication with the memory and with the one or more sensors, wherein the computer system is configured to perform a method. The method can include: determining, by the one or more processors, various variables related to the operation of the membranes, the determining comprising: measuring, by the one or more processors, over time, variables comprising operating limits of the membranes; and iteratively determining, by the one or more processors, based on inferring values of variables utilizing a method in a simulation, variables related to operation of the membranes, wherein the measured variables and the inferred variables comprise the variables, wherein the iteratively determining comprises applying an iterative mathematical model to determine a portion of the inferred variables, wherein the portion comprises one or more critical variables that cannot be measured directly; determining, by the one or more processors, based on the variables, an upper limit and a lower limit for various control parameters within the RO machine, wherein the various control parameters are controlled by active components of the RO machine; and deriving, by the one or more processors, for each of the various control parameters, an adjustment, wherein implementing the adjustment obtains optimal permeate recovery in the RO machine within the operating limits, wherein implementing the adjustment comprises setting a value.

Shortcomings of the prior art are overcome and advantages are provided through the provision of a system for intelligently controlling a reverse osmosis (RO) machine. The system can include an RO machine and a computer system communicatively coupled to the RO machine. The RO machine can include: one or more successive stages wherein each stage may comprise a plurality of membranes, wherein the plurality of membranes at each stage collectively comprise the membranes of the RO machine, one or more pumps preceding at least the first stage, wherein the one or more pumps move feedwater, concentrate or permeate from an inlet to a stage or from each earlier stage to a later stage of the one or more successive stages, valves fluidically coupled to a portion of the plurality of membranes of each stage, the valves controlling various controls within the RO system, the inlet for the feedwater, and outlets for the concentrate and the permeate, produced by the RO machine from the feedwater. The computer system can include a memory, one or more sensors dispersed throughout the RO machine, a portion of the sensors comprising one or more measurement devices, and one or more processors in communication with the memory and with the one or more sensors, wherein the computer system is configured to perform a method. The method can include: determining, by the one or more processors, various variables related to the operation of the membranes, the determining comprising: measuring, by the one or more processors, over time, variables comprising operating limits of the membranes; and iteratively determining, by the one or more processors, based on inferring values of variables utilizing a method in a simulation, variables related to operation of the membranes, wherein the measured variables and the inferred variables comprise the variables, wherein the iteratively determining comprises applying an iterative mathematical model to determine a portion of the inferred variables, wherein the portion comprises one or more critical variables that cannot be measured directly; determining, by the one or more processors, based on the variables, an upper limit and a lower limit for various control parameters within the RO machine, wherein the various control parameters are controlled by the active components of the RO machine; and deriving, by the one or more processors, for each of the various control parameters, an adjustment, wherein implementing the adjustment obtains optimal permeate recovery in the RO machine within the operating limits, wherein implementing the adjustment comprises setting a value, wherein a control parameter of the various controls comprises feed pressure, and wherein determining the upper limit and the lower limit for the feed pressure comprises: determining, by the one or more processors, a feed pressure adjustment to reach an operating limit of the operating limits based on a gradient comprising a ratio of change in a controlled variable versus a change in the feed pressure, wherein a smallest upward adjustment added to a current feed pressure is the upper limit for feed pressure; and defining, by the one or more processors, the lower limit for the feed pressure as no lower than a larger of sums for each stage of the one or more successive stages, a concentrate pressure drop in the stage and any previous stages plus an osmotic pressure at an outlet of the stage plus a permeate pressure of the stage.

Shortcomings of the prior art are overcome and advantages are provided through the provision of a method for intelligently controlling a reverse osmosis (RO) machine. The method can include: determining, by one or more processors, various variables related to operation of the membranes of a RO machine, the determining comprising: measuring, by the one or more processors, over time, variables comprising operating limits of the membranes; and iteratively determining, by the one or more processors, based on inferring values of variables utilizing a method in a simulation, variables related to operation of the membranes, wherein the measured variables and the inferred variables comprise the variables, wherein the iteratively determining comprises applying an iterative mathematical model to determine a portion of the inferred variables, wherein the portion comprises one or more critical variables that cannot be measured directly; determining, by the one or more processors, based on the variables, an upper limit and a lower limit for various control parameters within the RO machine, wherein the various control parameters are controlled by active components of the RO machine; and deriving, by the one or more processors, for each of the various control parameters, an adjustment, wherein implementing the adjustment obtains optimal permeate recovery in the RO machine within the operating limits, and wherein implementing the adjustment comprises setting a value.

Systems and methods relating to one or more aspects of the technique are also described and may be claimed herein. Further, services relating to one or more aspects of the technique are also described and may be claimed herein.

Additional features are realized through the techniques of the present invention. Other embodiments and aspects of the invention are described in detail herein and are considered a part of the claimed invention.

BRIEF DESCRIPTION OF DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawing.

FIG. 8 is a workflow that illustrates various aspects of the examples herein and in particular, when the control system detects sudden changes in the slope versus time of the critical operating parameters.

DETAILED DESCRIPTION OF THE INVENTION

Embodiments of the present invention include intelligent control systems for RO systems. In some embodiments of the present invention, this intelligent control system is implemented by communicatively coupling a programmable logic circuit to various sensors in an existing RO system. The intelligent control system assures the operational integrity of the RO system. Program code comprising a defined algorithm, in examples herein, adjusts feed pressure, concentrate circulation, brine flow, and permeate flux balancing for optimal production and recovery while respecting operational limits on membrane inflow, outflow, flux, recovery and pressure drop in an RO system. For example, the program code can control the RO system to yield the highest possible permeate production without exceeding upper operating limits when high output is desired and to allow operation at low output and high recovery without exceeding lower operating limits when less output is required.

As will be described in greater detail herein, the examples include an intelligent control system where program code executed by a processor keeps several interdependent operating variables within predefined limits by adjusting several interacting control parameters to achieve and maintain optimal performance of a semipermeable membrane-based machine, in any of its conventional configurations, to separate water containing dissolved solids into two streams, one containing low dissolved solids (permeate) and the other containing high dissolved solids (concentrate). An RO machine is used herein as an example but other machines with similar applications could also utilize aspects of the embodiments described herein. Certain aspects of the examples herein are of particular note when compared to existing approaches. The enumerated aspects are not an exhaustive list and represent merely certain aspects of some embodiments of the present invention.

Figure 2:
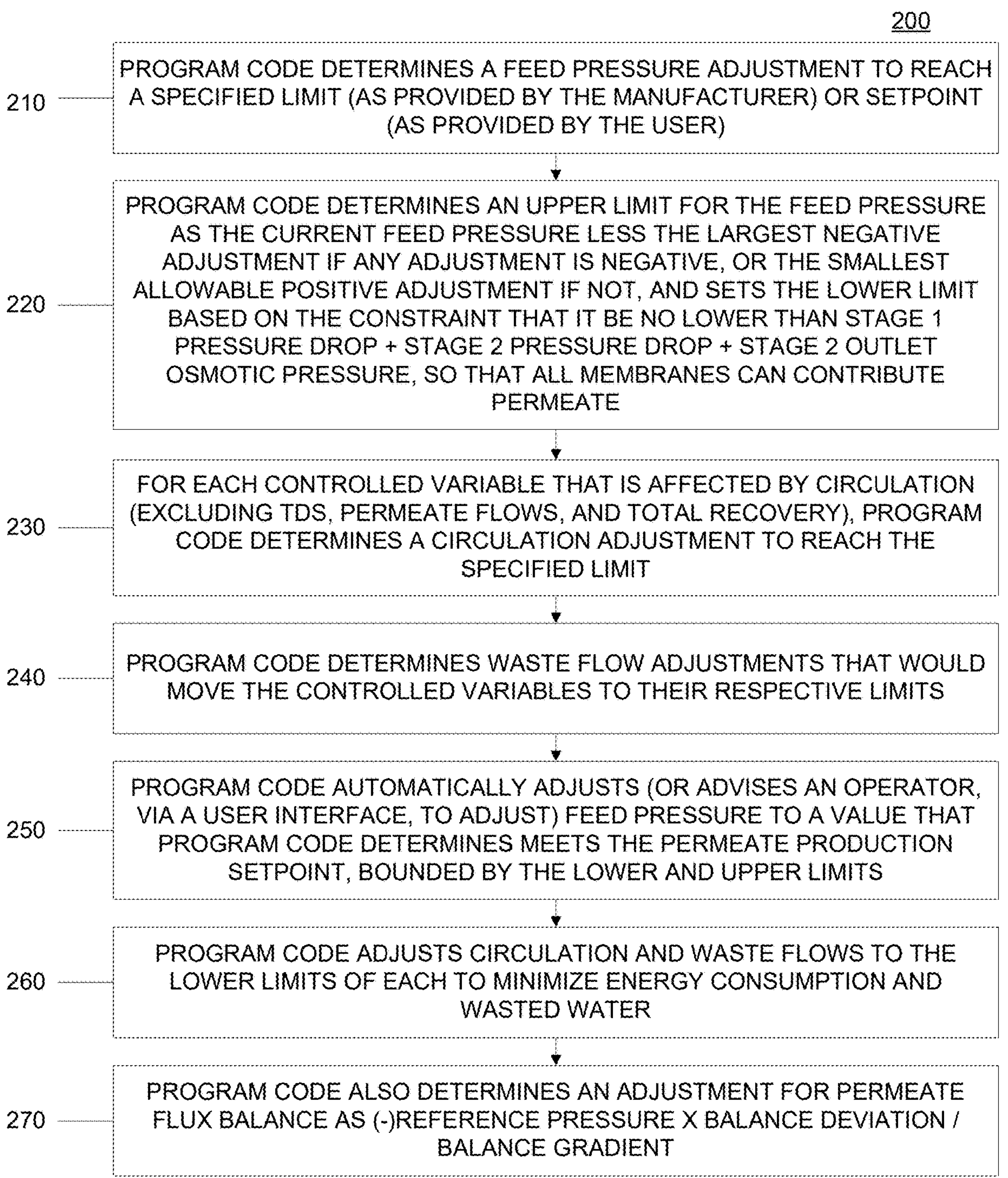
FIG. 2 is a workflow that illustrates various aspects of some embodiments of the present invention including the inclusion of an iterative mathematical model.
Figure 3:
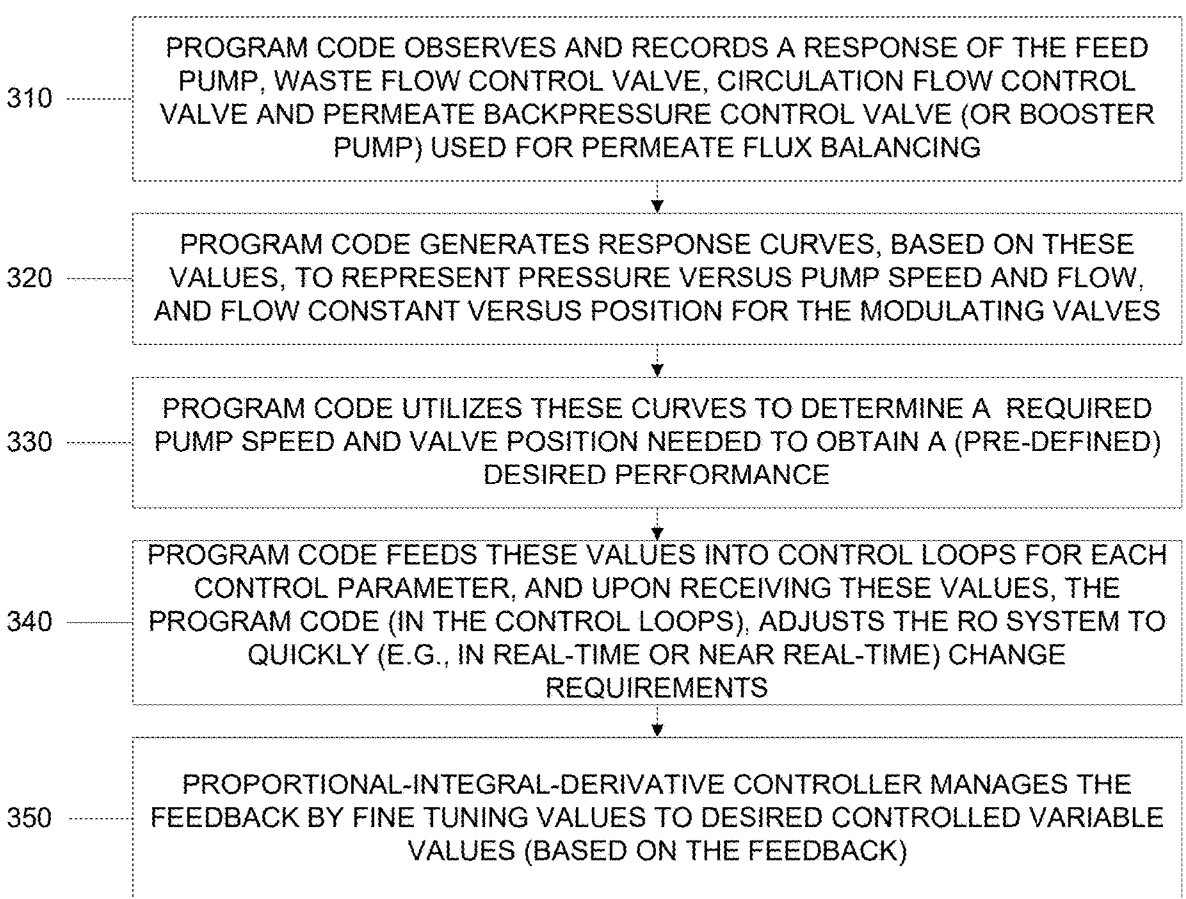
FIG. 3 is a workflow that illustrates various aspects of the learning engine functionality in some embodiments of the present invention including the inclusion of the iterative mathematical model.

First, in some examples, the program code, acting as a control system for the machine, comprises an iterative mathematical model and can infer critical variables that are not, or cannot be, directly measured, but to maintain optimal performance, the program code maintains these variables within limits as well. This aspect is depicted in FIGS. 2 and 3, for example.

Figure 4:
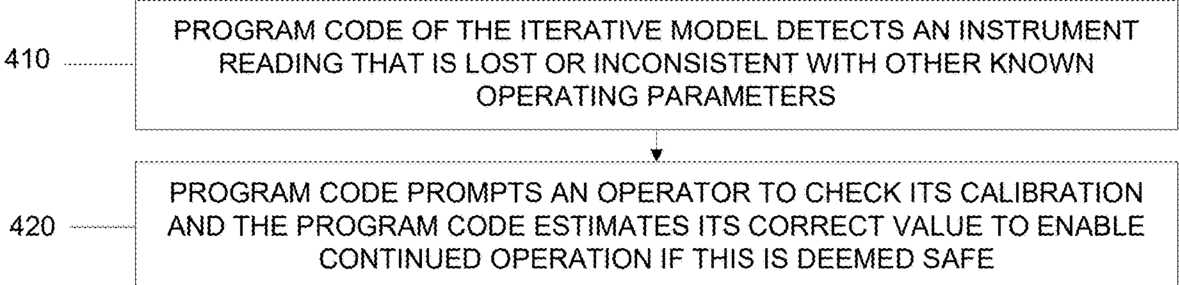
FIG. 4 is a workflow that illustrates various aspects of the learning engine functionality in some embodiments of the present invention including how program code can control the operating variables within limits and mitigate possible future issues.

Second, in addition to controlling the operating variables within the limits, the program code can mitigate possible future issues by: 1) detecting a probable failure in a process measurement device in the machine or system; 2) alerting an operator to address and fix the issue; and 3) inferring (including contemporaneously with the alerting) an approximate value of the variable. By inferring an approximate value and utilizing this value, the program code (which is a control system) can allow the machine to continue operating at possibly reduced efficiency, without endangering the integrity of the machine or its components, principally the membranes. These aspects are depicted in FIG. 4, for example.

Figure 6:
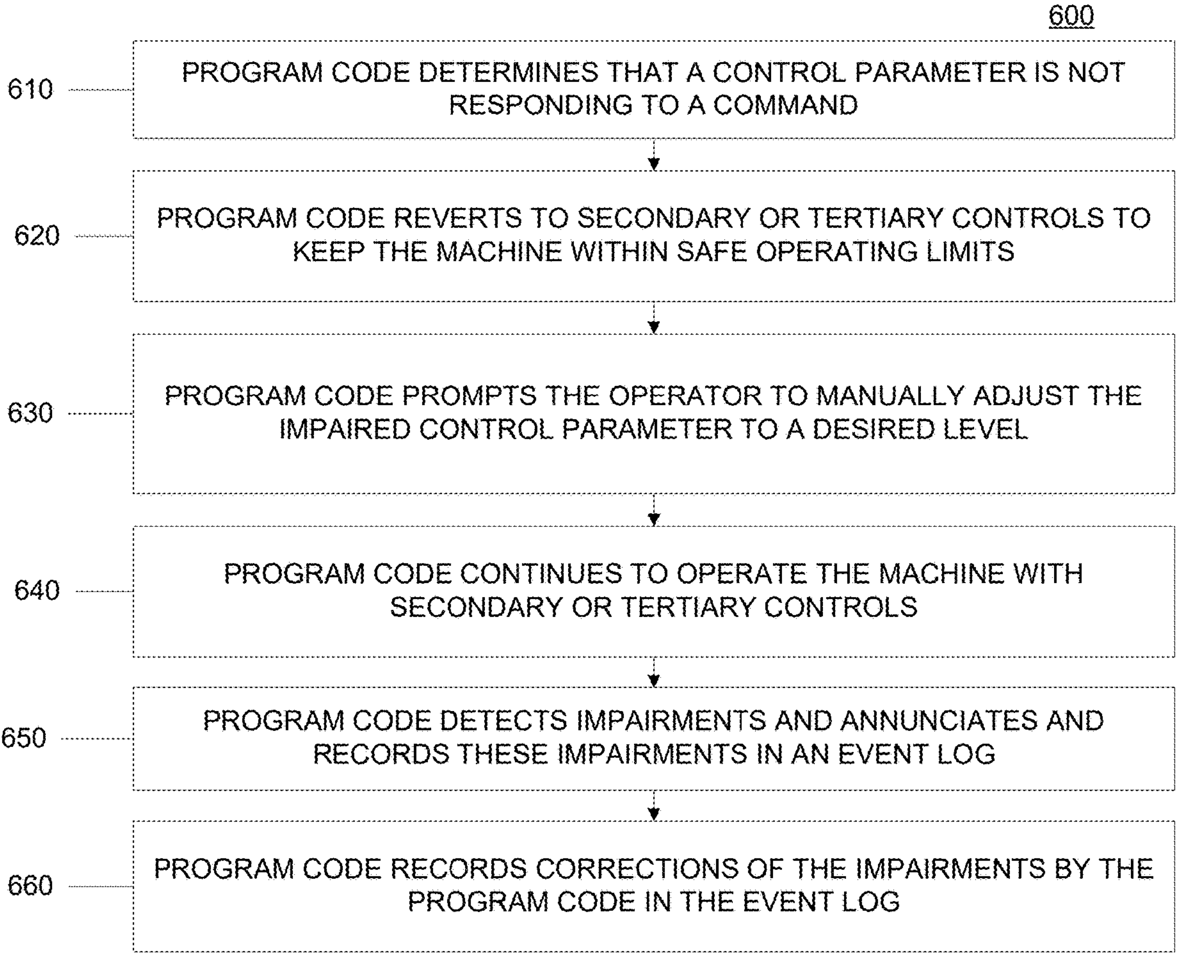
FIG. 6 is a workflow that illustrates various aspects of the examples herein and in particular, when the control system operates a machine in a semi-automatic mode when one of its control parameters or the corresponding feedback signal for a given control parameter, fails to respond.

Third, the program code comprising this control system can continue to operate in a semi-automatic mode when one of its control parameters or the corresponding feedback signal for a given control parameter, fails to respond. In this situation, the program code can alert an operator to manually adjust the control parameter but also, contemporaneously or additionally, the program code can compensate for the loss of automatic control of the parameter by adjusting the remaining control parameters to preserve system integrity. These aspects are depicted in FIG. 6, for example.

Fourth, the program code of the control system can monitor critical operating variables over time to predict maintenance needs (e.g., timing for cleaning or replacement of the membranes). The program code can also detect sudden changes in the slope versus time of the critical operating parameters to warn the operator of an operating fault, such as incorrect dosing of antiscalant chemicals. In addition to alerting the operator, the program code can compensate (including simultaneously with alerting the operator) for the detected change by reducing permeate production or recovery to preserve the integrity of the machine and its components. Certain of these aspects are depicted in FIG. 8, for example.

Figure 7:
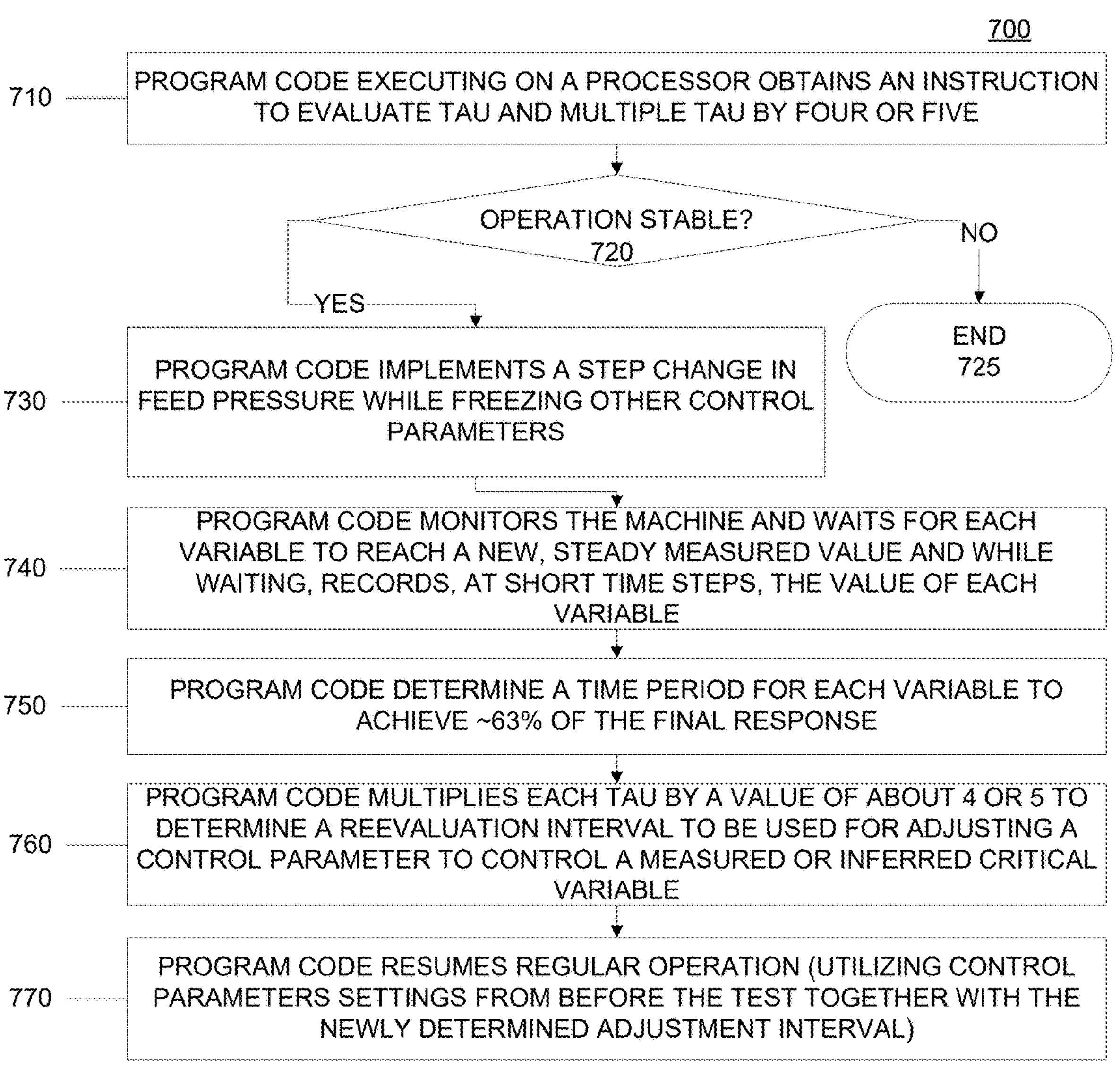
FIG. 7 is a workflow that illustrates various aspects of the examples herein and in particular, when the control system described herein can periodically test a step response of each controlled variable in the machines it controls.

Fifth, in some examples, the program code engages in machine learning. Specifically, the program code of the control system can learn how the (e.g., RO) machine will respond to adjustments in the control parameters by periodically calculating the gradient of the change in each controlled variable to a step change in a control parameter. Based on these calculations, the program code can predict future adjustments in the control parameter to achieve the desired value in a critical controlled variable. The program code stores the machine's response to adjustments in a memory and can utilize this memory (e.g., database) as a reference to anticipate issues in a machine moving forward. The program code can also continually update this memory resource to reflect any change in trends. Certain of these aspects are illustrated in FIG. 7, for example.

Sixth, the program code of the control system can periodically test a step response of each controlled variable to a deliberate step change in a control parameter to determine an optimum interval for recalculation of an output value for the controlled parameter according to which of the controlled variables is critical. Certain of these aspects are illustrated in FIG. 8, for example.

Examples used herein describe the implementation of the intelligent control system described herein in RO systems or machines, However, as understood by one of skilled in the art, aspects of the present invention can also be utilized for nano-filtration systems. Thus, the example of the RO system is meant to illustrate one type of system into which the aspects herein can be integrated, but it is not an exhaustive list of all systems into which this intelligent control system could be integrated to assist with both productivity and efficiency.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure.

The terms "connect," "connected," "contact" "coupled" and/or the like are broadly defined herein to encompass a variety of divergent arrangements and assembly techniques. These arrangements and techniques include, but are not limited to (1) the direct joining of one component and another component with no intervening components therebetween (e.g., the components are in direct physical contact); and (2) the joining of one component and another component with one or more components therebetween, provided that the one component being "connected to" or "contacting" or "coupled to" the other component is somehow in operative communication (e.g., electrically, fluidly, physically, optically, etc.) with the other component (notwithstanding the presence of one or more additional components therebetween). It is to be understood that some components that are in direct physical contact with one another may or may not be in electrical contact and/or fluid contact with one another. Moreover, two components that are electrically connected, electrically coupled, optically connected, optically coupled, fluidly connected or fluidly coupled may or may not be in direct physical contact, and one or more other components may be positioned therebetween.

The terms "including" and "comprising", as used herein, mean the same thing.

The terms "substantially", "approximately", "about", "relatively," or other such similar terms that may be used throughout this disclosure, including the claims, are used to describe and account for small fluctuations, such as due to variations in processing, from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to #0.1%, such as less than or equal to ±0.05%. If used herein, the terms "substantially", "approximately", "about", "relatively," or other such similar terms may also refer to no fluctuations.

As used herein, "electrically coupled" refers to a transfer of electrical energy between any combination of a power source, an electrode, a conductive surface, a droplet, a conductive trace, wire, waveguide, nanostructures, other circuit segment and the like. The terms electrically coupled may be utilized in connection with direct or indirect connections and may pass through various intermediaries, such as a fluid intermediary, an air gap and the like.

As used herein, the term "processor" refers to a hardware and/or software device that can execute computer instructions, including, but not limited to, one or more software processors, hardware processors, field programmable gate arrays (FPGAs), application-specific integrated circuits (ASICs), and/or programmable logic devices (PLDs), including programmable logic controllers (PLCs). Components of the system that can be utilized to execute aspects of embodiments of the present invention may include specialized hardware, including but not limited to, a GPP, an FPGA and a GPU (graphics processing unit). Additionally, items denoted as processors may include hardware and/or software processors or other processing means, including but not limited to a software defined radio and/or custom hardware. The term "program code" refers to both software and hard-coded instructions, such as those utilized by a PLC. A PLC is a microprocessor-based electronic component that serves as the programmable smarts for simple or isolated applications. Thus, the program code of a PLC is hard-coded and the PLC includes a microprocessor (a processor) that executes the program code.

As used herein, the term "real-time" refers to a guaranteed level of computer responsiveness within a specified time constraint, usually milliseconds or microseconds, between an event and its response deadline. Real time describes a human sense of time (rather than machine time) that seems immediate. Near real-time refers to the timeliness of data or information which has been delayed only by the time required for electronic communication and automatic data processing, meaning that there are no significant delays.

Embodiments of the present invention are inextricably tied to computing. The examples herein include an integration of a control system that utilizes artificial intelligence to operate an RO system effectively and efficiently. Many of the examples herein are RO systems that include a PLC-based control system that is communicatively coupled to various components of the RO system, including membranes, pumps, and/or various sensors that monitor the operation of the components. The PLC control system is an intelligent control system at least because it utilizes a rules-based expert system to optimize the RO system. The PLC that executes the aspects of the rules-based expert system is a specialized hardware component. The artificial intelligence provided by the PLC control system described herein improves the current (and future) operation of the RO system into which it is integrated, which includes various aspects that comprise a computing system, such as the PLC.

Embodiments of the present invention are directed to a practical application and provide significant advantages over existing approaches. Embodiments of the present invention include program code integrated into an RO system (e.g., utilizing a PLC communicatively coupled to sensors) to automate control and optimization of the RO systems via artificial intelligence (AI). Practical applications of examples described herein include but are not limited to: 1) predicting instrument failures in advance; 2) detecting, including in advance, and automatically correcting various operational failures; 3) provide indications to operators of issues with recommendations of what adjustments can be made to address these issues; and 4) automatically configuring elements of the RO systems to operate within optimized parameters. Because of the integration of AI elements into the examples described herein, these examples can be understood as intelligent control systems for RO systems.

Embodiments of the present invention are directed to a practical application because they ensure the operational integrity of the RO system by automatically adjusting operating parameters of the RO system (e.g., in order to remain within safe limits), including, but not limited to, the feed pressure, permeate balance, outlet flow, circulation, brine discharge flow, TDS, and/or total recovery. Aspects of various examples herein optimize the operation of RO systems, including keeping the RO system within safe limits, adjusting feed pressure, adjusting brine discharge flow, balancing permeate flux between stages, and/or adjusting circulation flow.

Another practical application is the feed forward control integrated into some of the examples. As will be discussed herein, the examples herein can also include a feed forward control, meaning, the program code (e.g., of the PLC) can calculate the required pump speeds and valve positions needed to obtain a desired performance. The program code then feeds these values forward in the control loops for each control parameter, so that the system adjusts quickly to changing requirements, and subsequent to those changes, can use feedback-based control for fine-tuning.

The program code also provides predictive calculations. The program code utilizes various variables to perform its (predictive) calculations and some of the values are difficult and/or time consuming or otherwise impractical to measure directly. Thus, to provide continuous optimized operation of the RO system, which is in itself a practical application, the program code can utilize an iterative model to infer variables not directly measured based on real-time inputs from the RO machine.

As noted above, certain of the practical applications of the examples herein is that they can detect (and/or predict) issues with components of the RO system. For example, in embodiments of the present invention, the iterative model which can be generated and/or utilized by the program code can detect an instrument reading that is lost or inconsistent with other known operating variables. The program code can then prompt the operator to check its calibration and estimate its correct value to enable continued operation if this is deemed safe. If a feedback signal malfunctions, the program code can continue operating the RO system provided that the program code can estimate values of control variables that can no longer be assessed accurately because of the signal malfunction, the program code can utilize secondary or tertiary controls to keep the machine within safe operating limits. Contemporaneously and/or subsequently, the program code prompts an operator to manually adjust the impaired control parameter to a desired level. The program code detects and annunciates impairments and can record these impairments in an event log. When the impairments are rectified, the program code can record the corrections of the impairments in the event log as well.

Embodiments of the present invention provide significantly more than existing approaches to regulating RO systems because unlike the existing approaches, embodiments of the present invention utilize program code (including a defined algorithm) to adjust feed pressure, concentrate circulation, brine flow, and permeate flux balancing for optimal production and recovery while respecting operational limits on membrane inflow, outflow, flux, recovery and pressure drop in an RO system. One existing approach is limited to checking various operating variables and advises a user when an issue is detected; however, unlike in the examples herein, in the existing approach, there is no control system that adjusts the operating parameters of the RO system (e.g., including in real-time or near real-time), to optimize performance of the RO system over time, as various variables change. Certain approaches can provide results that give a partial picture of the operation of an RO system at a given time, but do not control the system, as a whole, over time. For example, certain approaches can achieve at least partial RO control based on limited parameters (i.e., temperature, feedwater conductivity, pH), control exclusively feedwater pressure through manual adjustment, optimize operation by defining certain values (i.e., flux, recovery, pH and antiscalant dose), and use chemicals (e.g., chlorine) to control bacterial growth. None of the existing approaches utilize the comprehensive algorithm herein (executed by program code) to adjust feed pressure, concentrate circulation, brine flow, and permeate flux balancing for optimal production and recovery in real-time or near real-time while respecting operational limits on membrane inflow, outflow, flux, recovery and pressure drop.

Figure 1:
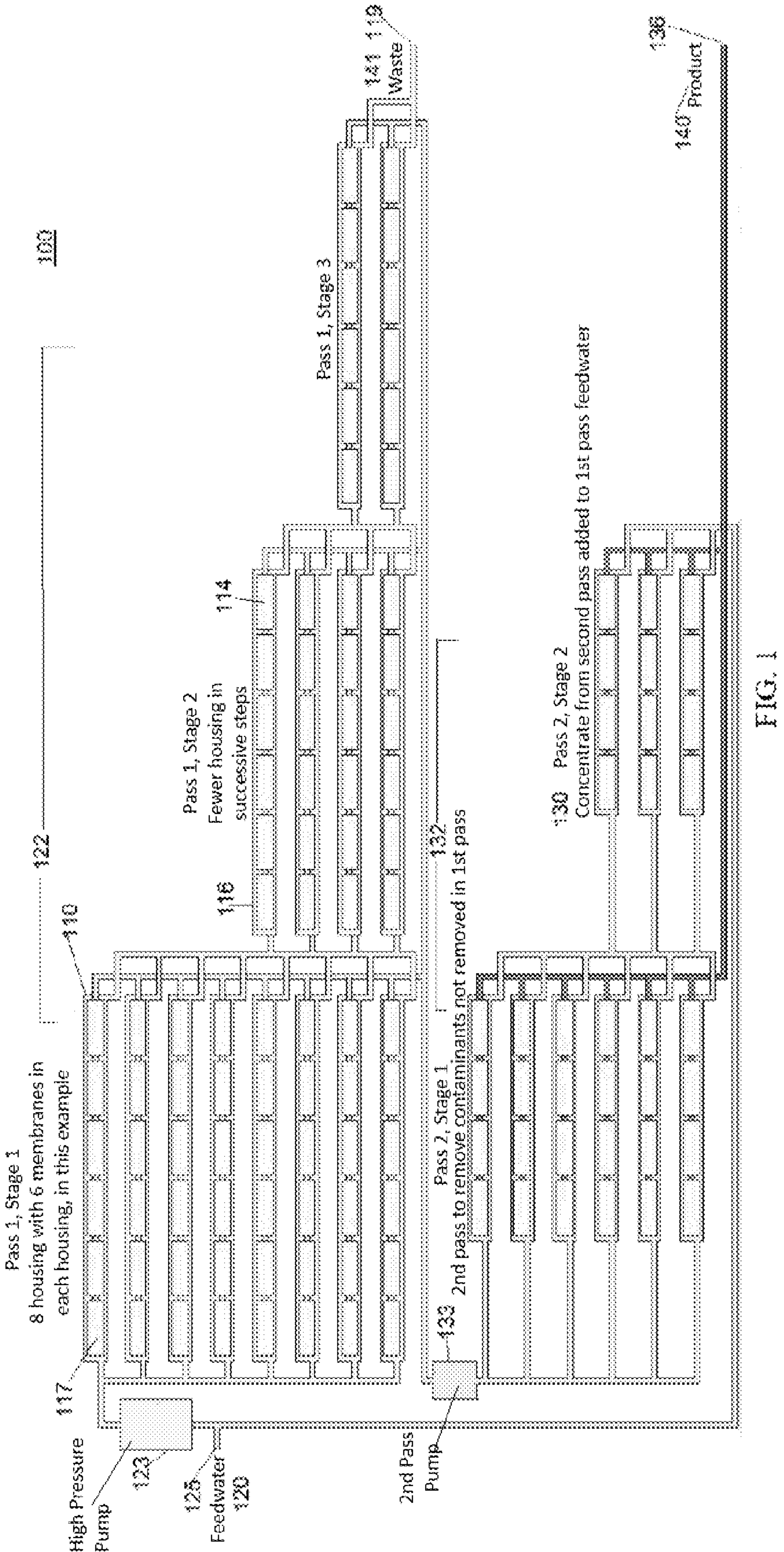
FIG. 1 depicts a system into which aspects of the present invention can be integrated, such that the embodiments described herein act as control systems for the system depicted in FIG. 1.

FIG. 1 illustrates aspects of an RO system. The operation of the RO system 100 can be optimized by utilizing a PLC to execute program code comprising the algorithm described herein for each stage of the RO system 100. As illustrated in FIG. 1, the RO system 100, includes RO membranes 110 that separate feedwater 120, provided to the RO system via an inlet, into two flows, concentrate, which is high in TDS, and permeate, which is low in TDS. As illustrated in FIG. 1, an RO machine may have more than one stage, where concentrate from the first stage 122 is the feedwater for the second stage 132, and so on. The RO system 100 of FIG. 1, like most RO systems, includes two stages, the first stage 122 and the second stage 132. Typically, half the feedwater is recovered as permeate in each stage and the other half carries forward to the next stage, so that a single stage machine recovers ~50%, a two-stage machine recovers ~75% and a three-stage machine recovers ~87.5%. These percentages can be increased by circulating concentrate to the feedwater inlet 125. In this RO system 100, the product 140 exits through an outlet 136 after the second stage 132. Waste 141 can exit through an outlet 119 after the first stage 122.

The RO system 100 includes a booster pump 133 between the stages, in addition to a high pressure pump 123 in advance of the first stage 122. Including the booster pump 133 between stages (e.g., the first stage 122 and the second stage 132) can be advantageous as, in this example, concentrate can be circulated independent of the preceding stage to the suction of the booster pump. The membrane module 114 comprising the RO membranes 110 in the RO system 100 are, in this example, cylindrical and installed in pressure vessels 116 that hold, for example, 6 membrane modules 114, although other RO systems 100 that can include aspects of the present invention can include pressure vessels that hold up to 8 modules. The number of membranes in a module is provided merely as an illustrative example and not to suggest any limitations. In some RO systems, membranes may be 2½", 4", 8" or 16" in diameter; the most common diameter is 8". Each stage of each pass can include several pressure vessels connected in parallel, with about half as many pressure vessels in the following stage. The RO system 100 of FIG. 1 includes a first pass with three stages and a second pass with two stages. A seawater potabilization RO will often have a second pass, where permeate from the first pass is made to pass through membranes specifically designed to retain boron which is not sufficiently retained by the first pass membranes. The first and second pass machines can each be controlled by the control system described herein, with some interaction to coordinate flows between the two.

In RO systems (e.g., FIG. 1, 100) feedwater is forced through the membranes by high pressure. There is a threshold pressure, referred to as the osmotic pressure, that is proportional to the TDS and below which water will not flow through the membrane to the permeate side. As the feedwater progresses from membrane to membrane and stage to stage, the TDS becomes more concentrated, and solids may start to precipitate. As purified water permeates through the membranes, a concentration gradient is established, with TDS more concentrated near the surface of the membrane than in the bulk flow of feedwater, which further contributes to the risk of precipitation and possible fouling of the membranes. To avoid this, membrane manufacturers establish operating limits on concentrate flow, permeate flow and recovery percentage. To protect the membranes mechanically, there are also limits on feedwater flow, operating pressure and hydraulic pressure drop on the concentrate side of the membrane.

Operating limits complicate control of RO systems or machines. These systems are generally controlled by well-trained operators to avoid rapid damage to the membranes and to find the optimum operating conditions for economical production of purified water. As aforementioned, the power required by the high-pressure feed pump is one economic consideration, but much more important is the water effectively wasted as concentrate (brine) effluent. There is cost associated with pumping and pretreating the feedwater and additional cost for disposing of the brine.

Because of the costs associated with operating RO systems, they are generally run at close to maximum capacity, with predefined operating parameters. Also because of the costs, during periods of low product water demand, the machine is shut down when the product storage tank is full. While shut down, microbial growth on the membranes may get out of control causing biological fouling. Optimal operation is affected by the temperature and TDS of the feedwater which will vary over time. A skilled operator can adjust for these variables, but this is manually intensive. In embodiments of the present invention, the program code controls the RO system automatically, continually, and more precisely than such an operator, while permitting variable permeate production.

An RO system (e.g., FIG. 1, 100) has various critical operating parameters. These parameters are enumerated below.

Maximum feed pressure—The feedwater/concentrate side of the membranes is pressurized to force water through the membrane while the permeate side is at near atmospheric pressure. The transmembrane pressure (TMP) is limited to avoid physical damage to the membrane. The first membrane (e.g., FIG. 1, 117) in the first stage sees the highest TMP.

Maximum inflow—The membrane is spiral wound around the central permeate collector pipe with the layers separated by a mesh that allows concentrate and permeate to flow between alternate layers, with concentrate flowing axially and permeate flowing in a spiral toward the collector. Excess flow on the concentrate side could damage the mesh, so there is a limit to the inflow. Again, the first membrane sees the highest inflow, though it could be the first membrane in the first or second stage since there are fewer pressure vessels in the second stage.

Maximum permeate flow (flux)—With higher rate of flow through the membrane, the concentration gradient increases, with risk of precipitation of solids at the face of the membrane, so the flux through the membrane must be limited. Since the first membrane in the first stage sees the highest TMP and lowest TDS, it will once again be the limiting element in this respect. It is not practical to measure the permeate flow of each membrane module since these come together within the pressure vessel in the collector tube, so this value is estimated by program code comprising the iterative model as a function of the measured variables.

Minimum concentrate flow—Concentrate flow creates turbulence around the mesh and reduces the concentration gradient, so there is a lower limit on this flow. In this case it is the last element in the first or second stage that will be critical, so the concentrate outlet flow from the pressure vessels of each stage must be monitored.

Maximum recovery—Manufacturers define an upper limit for the recovery (permeate flow/inflow) for any given membrane module. The maximum recovery can be estimated as a function of the measured variables by program code comprising the iterative model.

Maximum pressure vessel pressure drop—Pressure drop in the concentrate flow through the pressure vessel produces axial thrust that could exceed the resistance of the last module, thrust cone or downstream end closure of a pressure vessel, so this must be limited, which places an upper limit on the feedwater and concentrate circulation flows.

Maximum membrane module pressure drop—The pressure drop in the concentrate flow can cause telescoping of the spiral wound membrane, so this must be estimated by modelling (it is impractical to measure this directly) and limited. The first membrane in each stage sees the highest inflow and so will be the critical point.

The control system in embodiments of the present invention utilizes a control system that comprises a rules-based expert system, hence, employing AI. The rules-based expert system can utilize dimensionless parameters so that they are units agnostic; for example, percent of maximum flow rather than $m^3$/h or percent deviation from a limit or setpoint. The denominators used in the deviation calculations shown hereafter are provided as examples, for illustrative purposes only, but others could also be utilized in embodiments of the present invention. For example, the upper measurement limit of the instrument used to monitor a controlled variable.

For limits and setpoints, the program code in embodiments of the present invention utilizes a convention whereby a negative percent deviation indicates a safe value and a positive deviation indicates that something is more likely than not to be problematic. For upper limits, like feedwater inflow a positive deviation means the flow is too high. However, for a lower limit like concentrate outflow, a positive deviation means the flow is too low. For a setpoint like desired permeate production, positive deviation means the flow is more than necessary. To avoid unnecessary 'hunting' (repetitive up and down movement of a control parameter), slight negative deviations are ignored by the program code.

In the example, wherever the term <0 is used, it may be understood to represent less than a chosen increment below zero, such as <−0.5%. Hunting can be further reduced by dividing the calculated adjustment to a control parameter by a damping factor that increases as the process variable approaches its limit or setpoint.

An aspect of some embodiments of the present invention, which was enumerated earlier, is that the program code, acting as a control system for the machine, comprises an iterative mathematical model and can infer critical variables that are not, or cannot be, directly measured, but to maintain optimal performance, the program code maintains these variables within limits as well. In embodiments of the present invention, the program code cannot at all readily measure flows, pressure drops and recoveries for individual membrane modules within a vessel, but, instead, can estimate these values using an iterative model (mentioned above) based on vessel inlet and outlet conditions. Some deviations are specific to a stage (e.g., FIG. 1, 122, 132) in which case the program code can check for deviations for each stage. The relevant deviations are defined as follows.

$$DevQprm = \text{(radial flow of permeate (flux) through the first membrane in the vessel} - \text{upper limit for permeate flow)/upper limit for permeate flow.}$$

$$DevQin = \text{(inlet flow/pressure vessel in stage} - \text{inlet flow limit)/inlet flow limit.}$$

$$DevQout = \text{(lower limit for outlet flow} - \text{actual outlet flow)/lower limit for outlet flow.}$$

$$DevPDi = \text{(pressure drop in the axial flow of concentrate through the first membrane module} - \text{upper limit for individual membrane module pressure drop)/upper limit for individual membrane pressure drop.}$$

$$DevPDt = \text{(total pressure drop in the axial flow of concentrate through the vessel} - \text{upper limit for vessel pressure drop)/upper limit for vessel pressure drop.}$$

$$DevReci = \text{(maximum individual membrane module recovery} - \text{upper limit for recovery)/upper limit for recovery.}$$

DevRect=total percent recovery−desired total percent recovery. This is also an optional control parameter, not defined by the membrane manufacturer, but dependent on water quality. Total percent recovery=total permeate flow/feedwater flow.

$$DevCrcPct = \text{actual percent circulation} - \text{upper limit for circulation}.$$

$$\text{Actual percent circulation} = \text{concentrate circulation flow/concentrate flow from second stage (if present) or first stage (if not)}.$$

DevPrd=(total permeate flow−desired product flow)/maximum product flow. DevPrd is not a critical control parameter but rather a setpoint that may or may not be important to the user. Some users will prefer for the machine to operate always at maximum production.

DevTDScnc=(concentrate TDS−upper limit for concentrate TDS)/upper limit for concentrate TDS. Conductivity is used as a readily measurable surrogate for TDS. The TDS limit depends on the tendency of the dissolved solids to precipitate forming scale as their concentration increases.

DevTDSprm=(permeate TDS−upper limit for permeate TDS)/upper limit for permeate TDS. This deviation is not critical to the operation of the machine but is a setpoint defined by the user according to the required product water purity.

In embodiments of the present invention, the program code then feeds values forward in the control loops for each control parameter, so that the system adjusts quickly to changing requirements. In some examples, after the program code feeds the values, it can use feedback-based control for fine-tuning. The control parameters in an RO system can be expressed as percentages for the intelligent control algorithm of the program code. A reference pressure can be a maximum discharge pressure of the feed pump. A reference flow can be a maximum total inlet flow to the first stage pressure vessels.

In the RO systems that utilize the control system disclosed herein, the program code utilizes the flow of concentrate to waste to determine the degree of concentration of salts in the concentrate and the percentage of water recovery. Brine discharge flow also has a secondary effect on the pressure drops in the axial flow of concentrate and the flow into and out of the pressure vessels. It can be adjusted by a flow control valve (including the control system automatically controlling the control valve and/or alerting an operator to adjust the control valve).

In the examples herein, the RO system purifies water as it is forced through the reverse osmosis membrane by high pressure from the feed pump; higher pressure increases the flow of purified water. Pressure also has a secondary effect on the pressure drops caused by axial flow of concentrate through the spiral wound membrane and the percentage of purified water recovered from the feed water. Feed pressure is usually controlled by a variable speed drive on the feed pump; it can also be controlled by a flow valve in the feed pump discharge line, but this wastes energy.

While it is not always configured, circulation of concentrate from the outlet back to the inlet can be used to control the percentage of recovery in the membranes, allowing a higher overall recovery. It has a secondary effect on the pressure drops and the flow into and out of the pressure vessels. The circulation flow can be controlled by a flow regulating valve, in which case the return point is at the suction of the feed pump, or by a circulation pump, in which case the return point is at the discharge of the feed pump.

Permeate flux through the membranes will be higher in the first stage than the second stage because the concentrate pressure is higher and the osmotic pressure is lower, unless the transmembrane pressure is controlled. Balancing the permeate flux in the stages allows higher permeate production. This can be done by throttling the permeate flow from the first stage with a flow control valve to create back pressure or by increasing the concentrate pressure in the second stage with an interstage pump. Automatic permeate flux balance is for fine control and is often not configured in conventional RO control systems. This aspect therefore provides an advantage over existing approaches.

As discussed earlier, control parameters can affect more than one of the variables that are controlled by the program code in embodiments of the present invention. These control parameters can be understood as primary and secondary control parameters. A primary control parameter is usually a control parameter that has the most direct effect on a variable of interest. For examples, adjusting feed pressure is the only practical way to control permeate flux and total permeate production. Adjusting brine discharge flow is the primary control parameter for overall percentage recovery. Adjusting circulation flow is the primary control parameter for single membrane percentage recovery, axial flows and pressure drops. Adjusting permeate backpressure or interstage boost pressure balances the permeate flux.

In embodiments of the present invention, if a control parameter reaches a high or low limit, or fails to respond to automatic control, then the program code can utilize alternate mechanisms to keep the operating parameters within limits and continue operating as well as possible under the circumstances. For example, brine discharge flow can act as a secondary control for individual membrane module percentage recovery, axial flows and pressure drops, unless circulation is not configured, in which case brine discharge flow will be the primary mechanism. Feed pressure controls permeate production and overall recovery, and also can act as a secondary control for axial flows and pressure drops.

The program code automatically utilizes secondary control mechanisms when primary control mechanisms cannot be utilized.

Pressure, in the RO systems, can affect each controlled variable. Each time the feed pressure is adjusted by a significant amount and other control parameters are steady, the program code in the examples herein calculates a ratio of effect versus adjustment, referred to as the gradient. The program code maintains a running average of the calculated gradients for the effect of pressure on each controlled variable. Hence, the program code trains the algorithm it utilizes to adjust operation for the desired effect and adapt to changing water quality and aging of the membranes. Similarly, the program code calculates the gradient for permeate balance versus permeate backpressure or interstage boost pressure.

The program code periodically determines deviation percentages for each controlled variable, the program code also calculates the changes in the deviations as current deviations (reflecting changes since the previous determinations). The program code then calculates the gradient for each controlled variable as a percent change in deviation/percent change in pressure. The program code can apply various criteria so that only reliable gradient calculations are included in the running averages. Based on this repetition, the program code learns how the machine responds. The program code can utilize the learned values moving forward.

Because the system equilibrates after adjusting control parameters, the program code can pause for a pre-determined period of time before recalculating deviation percentages. The pre-determined period of time can vary depending on the variable that the program code is calculating. In some examples, the pre-determined period of time is a few minutes for TDS and a few seconds for other variables.

In embodiments of the present invention, Net Driving Pressure (NDP) is concentrate pressure-osmotic pressure-permeate pressure. The program code calculates this value for each stage based on the average of inlet and outlet conditions. The program code can store the gradient for flux versus NDP for each stage over time (normalized for feed water temperature which affects flux) so that the trend can indicate gradual deterioration in the performance of the membranes and detect anomalies that could point to component failure.

Axial flow (Q) and pressure drop (PD) are related by the equation $PD=(Q/k)^2$ where k is referred to as the flow constant. The program code calculates this 'constant' for each stage and stores the values it calculates over time, which serves as a measure of blockage in the concentrate flow. The program code can also calculate, and store over time a ratio of permeate TDS to concentrate TDS, which serves as a measure of TDS leakage and degradation of the membranes. The program code can display the values over time (i.e., the trends of these variables) graphically, for example, in a graphical user interface coupled to the processor (e.g., the PLC). By visualizing the values in the display (including the trends), the program code provides data in a manner that enables an operator to anticipate or predict when membrane maintenance (e.g., cleaning) should occur to maintain the operability of the machine. In some embodiments of the present invention, the program code displays the values over time and based on these values can automatically predict when membrane maintenance should occur to maintain the operability of the machine. The program code can display this prediction to an operator through the interface (e.g., as an alert)

FIG. 2 is a workflow 200 that illustrates how the intelligent controls described in the examples herein assure the operational integrity of the system by staying within safe limits. Membrane manufacturers specify limits on flows, pressure drops and recovery that insure the durability of the membranes. The workflow 200 details how the program code in the examples herein determines various values and utilizes these values to keep the operation of an RO machine within safe limits.

Referring to the workflow, for each controlled variable, the program code determines a feed pressure adjustment to reach a specified limit (as provided by the manufacturer) or setpoint (as provided by the user) and which can be stored in a memory accessible to the program code in the examples herein (210). The program code determines both an upper limit and a lower limit for the adjustment. The program code determines this adjustment as (−) reference pressure×deviation/gradient. In some examples, the program code determines an upper limit for the feed pressure as the current feed pressure less the largest negative adjustment if any required adjustment is negative (based on the analysis of the program code), or the smallest allowable positive adjustment if not, and sets the lower limit based on the constraint that it be no lower than stage 1 pressure drop+stage 2 pressure drop+stage 2 outlet osmotic pressure, so that all membranes can contribute permeate (220).

For each controlled variable that is affected by circulation (this excludes TDS, permeate flows, and total recovery), the program code determines a circulation adjustment to reach the specified limit (230). Because pressure drops (PD) are proportional to the square of flow, the program code calculates these adjustments as Qin×(SQRT (PDMax/PD)−1) where Qin is the total inlet flow to each stage. For inlet flows, the program code calculates the adjustments as QinMax−Qin. The program code determines the outlet flow adjustments using QoutMin−Qout. For the individual membrane recovery of each stage, the program code calculates adjustments as (Rec−RecMax)×(PrdStg+Qwst+Qcrc)/RecMax.

Similar to the circulation adjustments, the program code determines brine discharge flow adjustments that would move the controlled variables to their respective limits (240). The program code calculates TDS adjustments as Qwst×(TDS/TDSMax−1). The brine discharge flow adjustments for pressure drops, inlet and outlet flows, and individual membrane recoveries are the same as for circulation because both of these affect the flow through the membranes in the same way. The program code can calculate a brine discharge flow adjustment for total recovery as (Rect−RectMax)×(Prd+Qwst+Qcrc)/RectMax. The program code determines an upper limit for the circulation and brine discharge flows as the current flow less the largest applicable negative adjustment if any required adjustment is negative, or the smallest allowable positive adjustment if not, and sets the lower limit as the current flow less the smallest applicable negative adjustment if any allowed adjustment is negative, or the largest required positive adjustment if not.

The program code automatically adjusts (or advises an operator, via a user interface, including a graphical user interface (GUI), to adjust) feed pressure to a value that the program code determines meets the permeate production setpoint, bounded by the lower and upper limits (250). The program code adjusts circulation and brine discharge flows to the lower limits of each to minimize energy consumption and wasted water (260). In some embodiments of the present invention, to avoid overshoot (Gibbs phenomenon) when adjusting to a new set point, at each iteration the control parameter adjustments can be divided by a damping factor that increases as the relevant controlled variable approaches its limit or setpoint. The program code also determines an adjustment for permeate flux balance as (−) reference pressure×balance deviation/balance gradient (270) to set the pressure from the interstage booster pump if configured, or the stage 1 permeate pressure if not.

In ideal conditions, when there is no instrument failure, for example, the control system disclosed herein can utilize the aspects illustrated in FIG. 2 to keep the operation of a reverse osmosis machine within safe limits. However, one of the advantages of the examples herein is that the program code can operate under less than ideal circumstances and can still enable the safe maintenance and operation of RO systems.

Embodiments of the present invention include sensors that provide various data to the program code as the reverse osmosis process progresses. In one example, if the program code detects that all operational limits are satisfied, but the permeate production is different from the setpoint defined by the operator or a Supervisory Control and Data Acquisition (SCADA) system, the program code can automatically adjust (or prompt an operator to adjust) the brine discharge flow by a factor of PrdSet/Prd where PrdSet is the permeate production setpoint and Prd is the current permeate production, without exceeding the upper limit as previously determined for brine discharge flow.

The program code can determine that a control parameter needs to be adjusted, not for its direct effect on a controlled variable, but rather for its effect on the upper or lower limit of another control parameter. Although circulation does not directly affect total recovery, increasing circulation will lower the individual membrane recovery and increase the vessel outlet flow which may be limiting the feed pressure or brine discharge flow respectively and thereby the total recovery. In this circumstance, the program code can determine that these values are not as expected and automatically increase and/or prompt an operator to increase circulation the amount that the program code determined was a downward adjustment in brine discharge flow that could not be executed because of the limitation in membrane recovery or outlet flow. The program code calculates this value for each stage and utilizes the larger result to adjust the circulation flow without exceeding the upper limit as previously determined for circulation flow.

The program code can also adjust circulation based on determining that the permeate production is not as expected. Although circulation does not directly affect permeate production, increasing circulation will lower the individual membrane recovery which may be limiting the feed pressure and thereby the permeate production. In this case, the program code automatically increases and/or prompts an operator to increase circulation by an amount calculated as Vessels×Qin×(MIN(PrdSet/Prd, RectMax/Rect)−1), again calculated for each stage and taking the larger result without exceeding the upper limit as previously determined for brine discharge flow. When the production is greater than the setpoint, the program code can increase the circulation so that production can be decreased without diminishing the recovery or dropping below the minimum outlet flow; the circulation increase in this case is calculated as (Prd−PrdSet)×(1−Rect)/Rect.

By adjusting circulation, the program code can control the RO system to yield the highest possible permeate production without exceeding upper operating limits when high output is desired and to allow operation at low output and high recovery without exceeding lower operating limits when less output is required/desired.

FIG. 3 illustrates a workflow of a feed forward aspect of some embodiments of the present invention. In this workflow 300, the program code observes and records a response of the feed pump, brine discharge flow control valve, circulation flow control valve and permeate backpressure control valve (or booster pump) used for permeate flux balancing (310). The program code generates response curves, based on these values, to represent pressure versus pump speed and flow, and flow constant versus position for the modulating valves (320). The program code utilizes these curves to determine a required pump speed and valve position needed to obtain a (pre-defined) desired performance (330). The program code feeds these values into control loops for each control parameter, and upon receiving these values, the program code (in the control loops), adjusts the RO system to quickly (e.g., in real-time or near real-time) change requirements (340). After this initial adjustment, a Proportional-Integral-Derivative controller (PID) that is communicatively coupled to the system (which includes the PLC which can execute the program code hard-coded in the PLC memory) manages fine tuning values to desired controlled variable values (based on the feedback) (350).

Because it is impractical to measure all of the operating variables that the control system should manage to keep the RO system functioning as desired, embodiments of the present invention include an iterative model to infer variables that are not directly measured. For example, the recovery rate of the first membrane module in a vessel that typically holds 6 modules is significantly higher than that of the last module in the vessel. The recovered permeate from each membrane is collected in a common permeate pipe. Even then, it is unusual to measure the permeate flow from each stage because of the high cost of a flow meter, so only the total permeate production is measured.

The methods described herein provide various advantages over third-party software which can only perform off-line calculations and use static variables. In contrast, in examples herein, the program code can utilize methods similar to a third-party (e.g., membrane manufacturer) software, but can calculate the values online, in real-time. Membrane manufacturers provide simulation software that is used for off-line configuration of an RO machine. The third party software can determine overall operating parameters that will keep the unmeasured variables within limits. The software incorporates an aging factor, and the water quality parameters can be adjusted to determine the effect of anticipated variations on operation. But the offline calculations by the manufacturer's software cannot compensate for dynamically changing water quality and gradual degradation of the membranes throughout the process of utilizing the RO machine. Thus, an iterative model (which is part of the program code in embodiments of the present invention) provides operating parameters, just like the manufacturer software, but the accuracy and utility of the parameters provided by the iterative model are superior because the iterative model can provide online calculations, based on real-time inputs from the machine, thereby continually optimizing the operation. The program code continuously calculates these values as the RO machine operates, so that the values utilized by the program code to control the RO system are current to the present conditions of the RO system.

Another enumerated aspect of embodiments of the present invention is that in addition to controlling the operating variables within the limits, the program code can mitigate possible future issues by: 1) detecting a probable failure in a process measurement device in the machine or system; 2) alerting an operator to address and fix the issue; and 3) inferring (including contemporaneously with the alerting) an approximate value of the variable. By inferring an approximate value and utilizing this value, the program code (which is a control system) can allow the machine to continue operating at possibly reduced efficiency, without endangering the integrity of the machine or its components, principally the membranes. These aspects are illustrated in FIG. 4. The workflow 400 of FIG. 4 depicts how embodiments of the present invention can maintain continuity of operation of an RO system amidst an impairment. In an embodiment of the present invention, the program code of the iterative model detects an instrument reading that is lost or inconsistent with other known operating variables (410). The program code prompts an operator to check its calibration and the program code estimates the correct value for the instrument to enable continued operation if operation without this reading is deemed safe (420). In some embodiments of the present invention, the program code of the iterative model detects an instrument reading that is lost or inconsistent with other known operating variables (410) contemporaneously with the program code prompting the operator to check its calibration and the program code estimating the instrument's correct value to enable continued operation if the instrument is deemed safe (420). The feedforward control (of the program code) on observed and recorded response curves allows the system to continue operating 'blind' if a feedback signal malfunctions. As a precaution, for the controlled variables whose values are cast in doubt by the malfunction and are therefore estimated, any applicable upper limit can be lowered by the program code, and any applicable lower limit can be raised by the program code.

Figure 5:
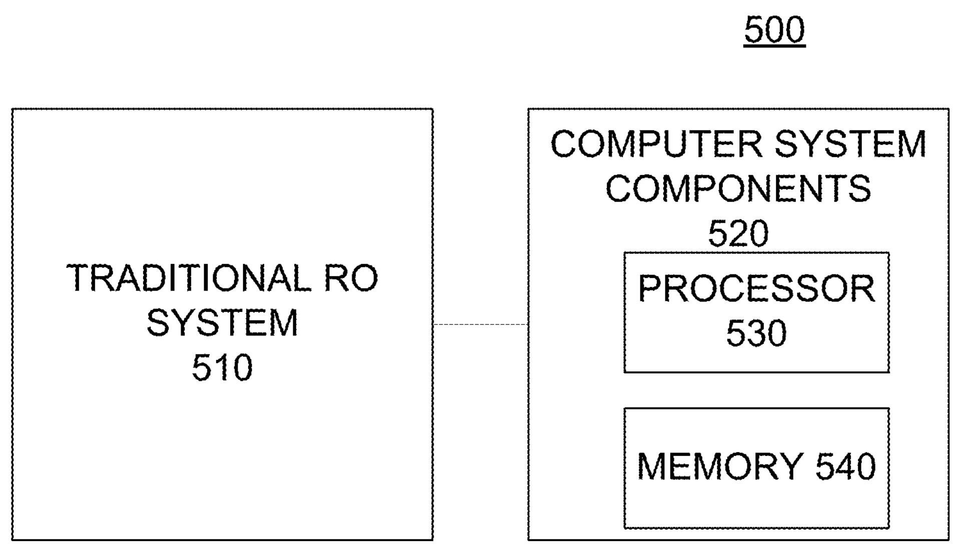
FIG. 5 is a block diagram that illustrates various aspects of some embodiments of the present invention.

FIG. 5 is a block diagram that represents various components of an RO system 500 in embodiments of the present invention. The system 500 includes a traditional RO system 510, such as that in FIG. 5. Communicatively coupled to the system are various computer system components (hardware and/or software) 520, which can include one or more processors 530 (e.g., a PLC and an HMI), and one or more memories 540. The one or more processors 520 execute program code, which includes an algorithm and an iterative model. Program code also collects and manages feedback (e.g., PID control). The computer system components 520 can obtain data from various sources, including but not limited to, one or more sensors integrated into the traditional RO system 510 and historical data stored by the program code in a memory 540. The processor 530, executing program code, which can be stored in the memory 540, adjusts various aspects of the traditional RO system 510, including but not limited to feed pressure, concentrate circulation, brine flow, and permeate flux balancing for optimal production and recovery while respecting operational limits on membrane inflow, outflow, flux, recovery and pressure drop in the RO system 510.

FIG. 6 is a workflow 600 that illustrates how the program code comprising this control system can continue to operate in a semi-automatic mode when one of its control parameters or the corresponding feedback signal for a given control parameter, fails to respond. As discussed earlier, in this situation, the program code can alert an operator to manually adjust the control parameter but also, contemporaneously or additionally, the program code can compensate for the loss of automatic control of the parameter by adjusting the remaining control parameters to preserve system integrity. As illustrated in the workflow 600, the program code determines that a control parameter is not responding to a command (610). The program code reverts to secondary or tertiary controls to keep the machine within safe operating limits (620). The program code prompts the operator to manually adjust the impaired control parameter to a desired level (630). The program code can prompt the operator contemporaneously with continuing to operate the machine with secondary or tertiary controls (640). In some examples, if the program code determines that an issue is present which increases a fouling rate of membranes comprising the machine, the program code adjusts the TDS and recovery limits to compensate for the issue. Examples of such an issue include, but are not limited to, an antiscalant chemical having been exhausted and/or a significant degradation in the flux rate. The program code detects impairments and annunciates and records these impairments in an event log (650). The program code can also record an eventual correction of the impairment by the program code in the event log (660).

As discussed earlier, the program code of the control system can periodically test a step response of each controlled variable to a deliberate step change in a control parameter to determine an optimum interval for recalculation of an output value for the controlled parameter according to which of the controlled variables is critical. To test a step response, the program code can evaluate a value "tau" which is the time for a response to reach ~63% of its final value after a step change. In some examples, tau comprises time utilized to reflect 63% of a final effect of a step change in feed pressure.

FIG. 7 illustrates a workflow 700 of this aspect. Referring to FIG. 7, program code executing on a processor obtains an instruction to evaluate tau and multiply tau by ~four or five (710) to obtain a reevaluation interval. In some examples, an operator can enter a command (via a GUI) to trigger this sequence when the machine (e.g., the RO system) is operating under stable conditions. By triggering this process when the machine is operating under stable conditions, the regular operation of the machine is less likely to be negatively impacted by moderate perturbance, which triggering this procedure can generate. Based on receiving the instruction, the program code confirms that operation of the machine is stable (e.g., within expected pre-configured or pre-defined operating parameters) (720). If the program code determines that the operation is not stable, the program code does not proceed with the test (725). Based on determining that the machine is stable, the program code implements a step change in feed pressure while freezing other control parameters (730). In some examples, the step change is large enough to produce a reliably measurable change in each measured process variable. General response times with an RO machine can vary. While a response time for a pressure and/or flow change can be several seconds, a response time for total dissolved solids can be several minutes. Thus, what can be considered a short time step can vary based on whether the timing is related to pressure and/or flow or total dissolved solids. The program code monitors the machine and waits for each variable to reach a new, steady measured value and while waiting, records, at short time steps (e.g., 1s for pressure and/or flow and 10s for total dissolved solids (conductivity)), the value of each variable (740). Based on the recorded values over time, the program code determines a time period for each variable to achieve ~63% of the final response (750). The program code multiplies each tau by a value about 4 or 5 to determine a reevaluation interval to be used for adjusting a control parameter to control a measured or inferred critical variable (760). The program code resumes regular operation (utilizing control parameters settings from before the test together with the newly determined adjustment interval) (770).

Program code in embodiments of the present invention can predict maintenance needs, as illustrated in the workflow 800 of FIG. 8. In this example, the program code detects sudden changes in the slope versus time of critical operating parameters (810). Based on detecting the change, the program code warns (e.g., through a GUI) the operator of an operating fault (e.g., incorrect dosing of antiscalant chemicals) (820). The program code compensates (including simultaneously with alerting the operator) for the detected change by reducing permeate production or recovery to preserve the integrity of the machine and its components (830).

Figure 9:
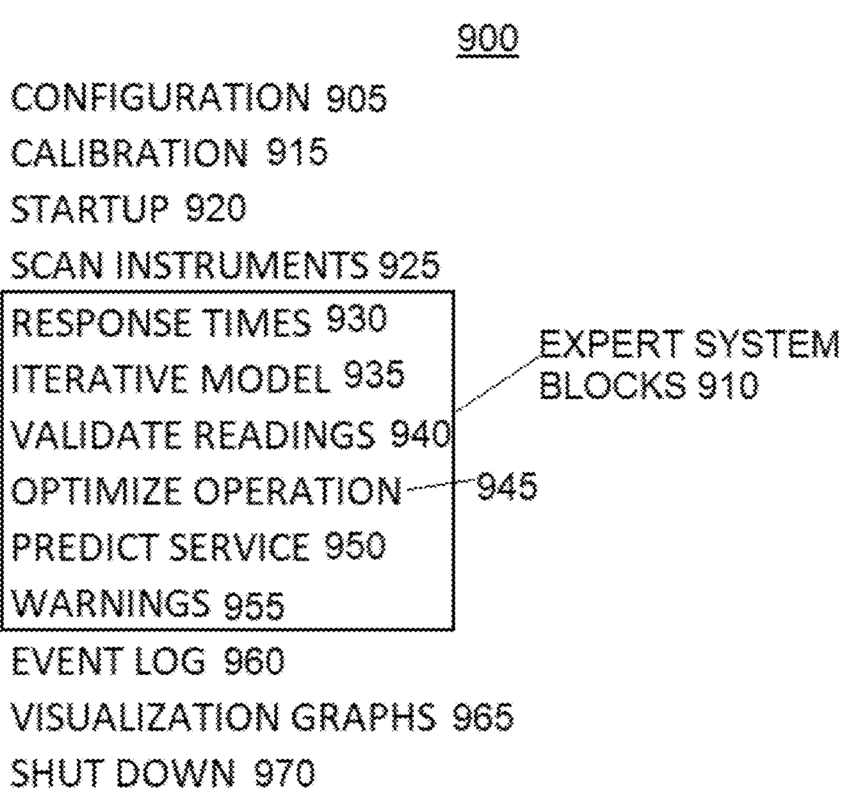
FIG. 9 depicts various program blocks that can be utilized to perform various aspects of some embodiments of the present invention.

FIG. 9 is an illustration of various program blocks 900 that comprise program code that controls an RO machine (and can be executed by processors integrated into the RO machine and/or communicatively coupled to the RO machine). These program blocks are only one example of a possible configuration of various controls and functionalities of an RO machine that can be utilized in some embodiments herein. The program blocks are separated for illustrative purposes only and not to provide any structural limitations. The program blocks can be incorporated into hardware and/or software elements of an RO machine.

Referring to FIG. 9, the program blocks 900 are separated into various functionalities that are incorporated into existing RO machines and elements that are disclosed herein which are directed to the functionalities that enables the examples herein to provide significantly more than existing RO machine control systems. The program blocks that are not found in existing RO machines are labeled expert system blocks 910. As illustrated in FIG. 9, program blocks in an RO machine can control functionalities including configuration 905, calibration 915, startup 920, and scanning of instruments 925 (comprising the RO machine). Once the RO machine is configured (which can occur in advance of usage) and calibrated (which can also occur in advance of usage), the program code can startup 920 the RO machine (e.g., utilizing values from the configuration 905 and calibration 915). As the RO machine operates, the program code can continuously scan various instruments 925 to monitor operation of the RO machine.

The expert system blocks 910 include controls for response time 930, an iterative model 935, program code that validates readings 940, optimize operation 945, predict when the RO machine should be serviced 950, and provide timely warnings 955 when the program code determines there is an issue. The response time 930 functionality refers to the program code implementing step changes (e.g., in feed pressure) and monitoring the RO machine, which is discussed in more detail in preceding figures. The iterative model 935 can detect an instrument reading that is lost or inconsistent with other known operating variables. Utilizing values generated by the iterative model 935, the program code can validate readings 940 of various instruments comprising the RO machine. Program code in the expert system blocks 910 also optimizes operation 945 of the RO machine including automatically configuring elements of the RO systems to operate within optimized parameters. Because the program code monitors operation of the RO machine, the program code can anticipate issues and this can predict when service 950 of the components of the RO machine is needed in the future. The program code can alert users to upcoming service needs. Additionally, the program code can issue warnings 955 contemporaneous with issues experienced by elements of the RO machine.

Various other elements in existing systems can work with the expert system blocks 910. The program code records values, readings, operational events, etc. in an event log 960. The RO machine comprises program code that enables visualization of the operation (including events and values) in the RO machine, including by generating visualization graphs 965. Program code also can shut down 970 the RO machine.

Figure 10:
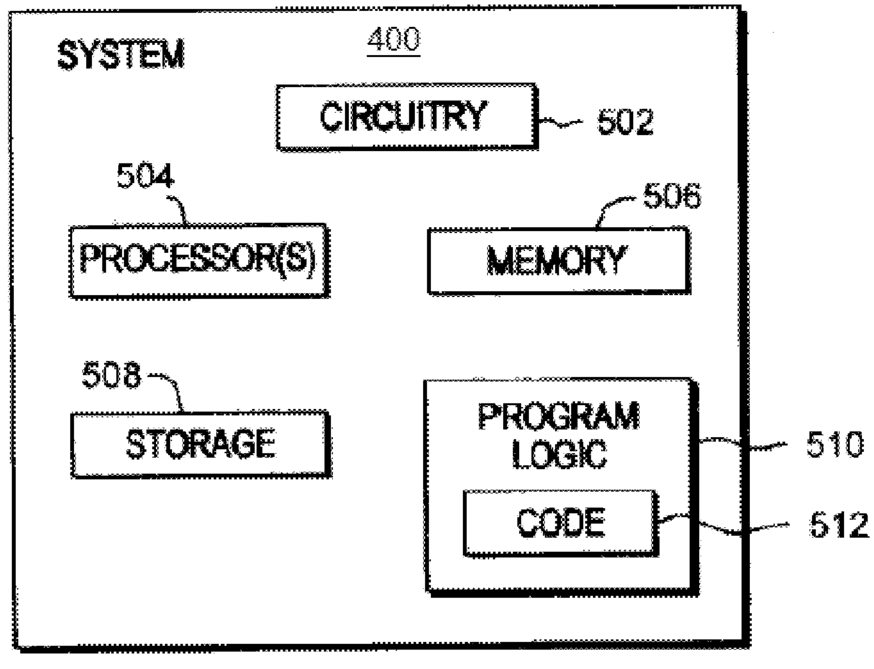
FIG. 10 depicts a computer system configured to perform an aspect of an embodiment of the present invention.
Figure 11:
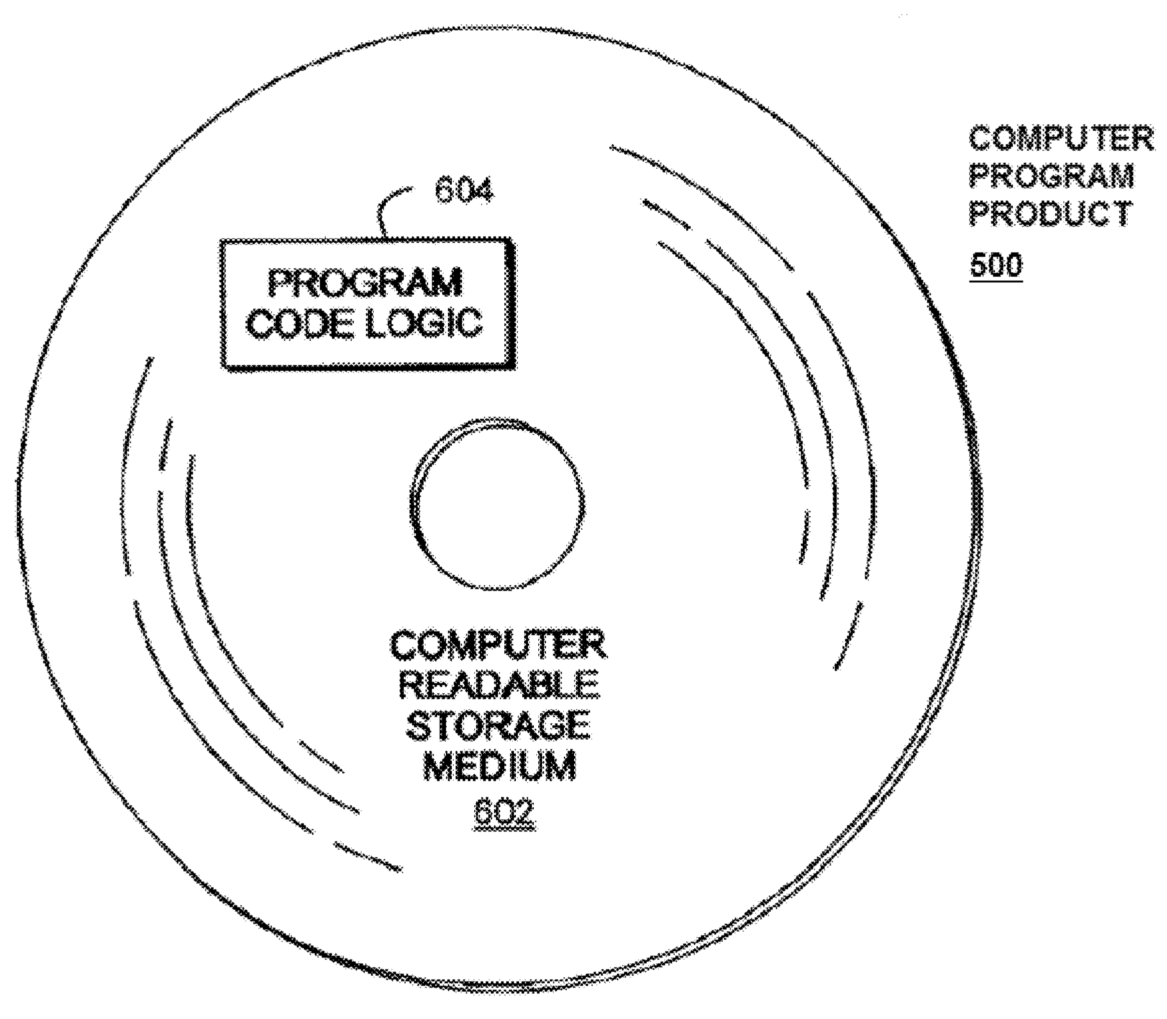
FIG. 11 depicts a computer program product incorporating one or more aspects of the present invention.

FIG. 10 illustrates a block diagram of a resource 400 in computer system, which is part of the technical architecture of certain embodiments of the technique. The resource 400 may include a circuitry 502 that may in certain embodiments include a microprocessor 504. The computer system 400 may also include a memory 506 (e.g., a volatile memory device such as RAM, DRAM, SRAM, etc.), and storage 508. The storage 508 may include a non-volatile memory device (e.g., EEPROM, ROM, PROM, flash, firmware, programmable logic, etc.), magnetic disk drive, optical disk drive, tape drive, etc. The storage 508 may comprise an internal storage device, an attached storage device and/or a network accessible storage device. The system 400 may include a program logic 510 including code 512 that may be loaded into the memory 508 and executed by the microprocessor 504 or circuitry 502.

In certain embodiments, the program logic 510 including code 512 may be stored in the storage 508, or memory 506. In certain other embodiments, the program logic 510 may be implemented in the circuitry 502. Therefore, while FIG. 10 shows the program logic 510 separately from the other elements, the program logic 510 may be implemented in the memory 506 and/or the circuitry 502. The program logic 510 may include the program code discussed in this disclosure that facilitates the reconfiguration of elements of various computer networks, including those in various figures.

Using the processing resources of a resource 400 to execute software, computer-readable code or instructions, does not limit where this code can be stored. Referring to FIG. 10, in one example, a computer program product 500 includes, for instance, one or more non-transitory computer readable storage media 602 to store computer readable program code means or logic 604 thereon to provide and facilitate one or more aspects of the technique.

As will be appreciated by one skilled in the art, aspects of the technique may be embodied as a system, method or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the technique may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electromagnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electromagnetic, optical or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the technique may be written in any combination of one or more programming languages, including ladder logic, an object oriented programming language, such as Java, Smalltalk, C++ or the like, and conventional procedural programming languages, such as the "C" programming language, PHP, ASP, assembler or similar programming languages, as well as functional programming languages and languages for technical computing (e.g., Python, Matlab). The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Furthermore, more than one computer can be used for implementing the program code, including, but not limited to, one or more resources in a cloud computing environment.

Aspects of the technique are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions, also referred to as software and/or program code, may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the technique. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the technique may be provided, offered, deployed, managed, serviced, etc. by a service provider who offers management of customer environments. For instance, the service provider can create, maintain, support, etc. computer code and/or a computer infrastructure that performs one or more aspects of the technique for one or more customers. In return, the service provider may receive payment from the customer under a subscription and/or fee agreement, as examples. Additionally, or alternatively, the service provider may receive payment from the sale of advertising content to one or more third parties.

In one aspect of the technique, an application may be deployed for performing one or more aspects of the technique. As one example, the deploying of an application comprises providing computer infrastructure operable to perform one or more aspects of the technique.

As a further aspect of the technique, a computing infrastructure may be deployed comprising integrating computer readable code into a computing system, in which the code in combination with the computing system is capable of performing one or more aspects of the technique.

As yet a further aspect of the technique, a process for integrating computing infrastructure comprising integrating computer readable code into a computer system may be provided. The computer system comprises a computer readable medium, in which the computer medium comprises one or more aspects of the technique. The code in combination with the computer system is capable of performing one or more aspects of the technique.

Further, other types of computing environments can benefit from one or more aspects of the technique. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the technique, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code to reduce the number of times code must be retrieved from bulk storage during execution.

Input/Output or I/O devices (including, but not limited to, keyboards, Human-Machine-Interface (HMI) displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or steps plus function elements in the descriptions below, if any, are intended to include any structure, material, or act for performing the function in combination with other elements as specifically noted. The description of the technique has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described to best explain the principles of the invention and the practical application, and to enable others of ordinary skill in the art to understand the invention for various embodiments with various modifications as are suited to the particular uses contemplated.

The invention claimed is:

1. A system for intelligently controlling a reverse osmosis (RO) machine, the system comprising:

an RO machine, the RO machine comprising:

one or more successive stages wherein each stage comprise a plurality of membranes, wherein the plurality of membranes at each stage collectively comprise the membranes of the RO machine;

one or more pumps preceding at least the first stage, wherein the one or more pumps move feedwater, concentrate or permeate from an inlet to a stage or from each earlier stage to a later stage of the one or more successive stages;

one or more valves fluidically coupled to a portion of the plurality of membranes of each stage, the one or more valves controlling various controls within the RO system;

inlet for feedwater; and outlets for concentrate and permeate, produced by the RO machine from the feedwater; and a computer system communicatively coupled to the RO machine, the computer system comprising:

a memory;

one or more sensors dispersed throughout the RO machine, a portion of the sensors comprising one or more measurement devices; and one or more processors in communication with the memory and with the one or more sensors, wherein the computer system is configured to perform a method, the method comprising:

determining, by the one or more processors, various variables related to the operation of the membranes, the determining comprising:

measuring, by the one or more processors, over time, variables comprising operating limits of the membranes; and iteratively determining, by the one or more processors, based on inferring values of variables utilizing a method in a simulation, variables related to operation of the membranes, wherein the measured variables and the inferred variables comprise the variables, wherein the iteratively determining comprises applying an iterative mathematical model to determine a portion of the inferred variables, wherein the portion comprises one or more critical variables that cannot be measured directly;

determining, by the one or more processors, based on the variables, an upper limit and a lower limit for various control parameters within the RO machine, wherein the various control parameters are controlled by active components of the RO machine;

deriving, by the one or more processors, for each of the various control parameters, an adjustment, wherein implementing the adjustment obtains optimal permeate recovery in the RO machine within the operating limits, wherein implementing the adjustment comprises setting a value;

obtaining, by the one or more processors, iteratively, over time, from one or more components comprising the RO system, a response to the change in feed pressure;

generating, by the one or more processors, based on the response, one or more response gradients;

determining, by the one or more processors, based on the one or more response gradients, values comprising pump speeds for the one or more pumps and valve positions for the one or more valves to obtain a pre-determined performance from the RO system;

determining, by the one or more processors, a time interval in which the RO machine will adjust feed pressure, wherein the feed pressure is a control parameter of the various control parameters, the determining comprising:

obtaining, by the one or more processors, via an interface, a command to trigger an evaluation of a step change response to feed pressure in the RO machine for measurements in the RO machine obtained by the one or more measurement devices;

confirming, by the one or more processors, that the RO machine is operating within pre-determined operating parameters, based on the operating limits of the membranes:

based on the confirming, implementing, commencing, by the one or more processors, the step change sequence, wherein the step change sequence comprises facilitating a step change in feed pressure, while maintaining other control parameters of the various control parameters;

monitoring, by the one or more processors, the RO machine until the measured variables reach new consistent values, wherein the monitoring comprises recording intermittent values for the variables during the monitoring;

determining, by the one or more processors, a time period for each variable a tau for each variable;

multiplying, by the one or more processors, a largest tau of the taus for each variable by a static value to determine the time interval; and resuming, by the one or more processors, regular operation of the RO machine.

2. The system of claim 1, wherein in the RO machine comprises more than one stage, and wherein the various control parameters are selected from the group consisting of: feed pressure, concentrate circulation, and brine discharge flow, prior stage permeate pressure, and interstage booster pressure.

3. The system of claim 1, wherein the confirming that the RO machine is operating within pre-determined operating parameters further comprises:

obtaining, by the one or more processors, coefficients of variation for the various control parameters; and confirming, by the one or more processors, that the various control parameters are stable, based on the coefficients of variation.

4. The system of claim 1, wherein the one or more successive stages each comprise one or more pressure vessels, each stage of the one or more successive stage comprising one or more membrane modules, and wherein a control parameter of the various controls comprises feed pressure, wherein determining the upper limit and the lower limit for the feed pressure comprises:

determining, by the one or more processors, a feed pressure adjustment to reach an operating limit of the operating limits based on a gradient comprising a ratio of change in a controlled variable versus a change in the feed pressure, wherein a smallest upward adjustment added to a current feed pressure is the upper limit for feed pressure; and defining, by the one or more processors, the lower limit for the feed pressure as no lower than a larger of sums for each stage of the one or more successive stages, a concentrate pressure drop in the stage and any previous stages plus an osmotic pressure at an outlet of the stage plus a permeate pressure of the stage.

5. The system of claim 1, wherein the method further comprises:

feeding, by the one or more processors, the values for the adjustments into control loops for each control parameter of the various control parameters;

automatically adjusting, by the one or more processors, the RO system to utilize the values for the adjustments; and based on the automatically adjusting utilizing the values, controlling, by the one or more processors, feedback-based control for fine tuning of the RO machine.

6. The system of claim 1, wherein the method further comprising:

feeding, by the one or more processors, the values into control loops for each control of the various controls;

automatically adjusting, by the one or more processors, the RO system to utilize the values; and based on the automatically adjusting utilizing the values, controlling, by the one or more processors, feedback-based control for fine tuning of the RO machine.

7. The system of claim 1, the method further comprising:

detecting, by the one or more processors, a lost reading or an inconsistent reading from an instrument in the RO system, wherein the detecting the lost reading or the inconsistent reading from the instrument in the RO system comprises:

comparing, by the one or more processors, the lost reading or the inconsistent reading to an expected reading, wherein the expected reading is stored in the memory, and wherein the expected reading was determined by the iterative model; and prompting, by the one or more processors, an operator of the RO machine to check the instrument for operability.

8. The system of claim 1, the method further comprising:

detecting, by the one or more processors, a probable failure in a process measurement device of the one or more measurement devices in the RO machine;

alerting, by the one or more processors, via an interface communicatively coupled to the one or more processors, an operator of the probable failure;

contemporaneously with the alerting, inferring, by the one or more processors, an approximate value of a variable of the various variables related to the operation of the membranes; and continuing, by the one or more processors, operation of the membranes at a reduced efficiency utilizing the approximate value as a control.

9. The system of claim 1, wherein one or more of the measured variables and the inferred variables are impacted by an adjustment to concentrate circulation, wherein the adjustment to concentrate circulation comprises an adjustment to a control of the various controls, wherein deriving the adjustment to the concentrate circulation comprises an adjustment enabling a total recovery to reach a specified limit.

10. The system of claim 1, the method further comprising:

for each of the various control parameters, implementing, by the one or more processors, the adjustment.

11. The system of claim 1, the method further comprising:

communicating, by the one or more processors, continuously with the one or more sensors;

obtaining, based on the continuously communicating, responses from the one or more sensors;

determining, by the one or more processors, based on the obtaining, that a feedback signal corresponding to a sensor of the one or more sensors, is not responding within an expected interval;

alerting, by the one or more processors, via an interface communicatively coupled to the one or more processors, an operator to manually adjust a given control of the various controls, wherein the given control corresponds to the feedback signal; and contemporaneously with the alerting, automatically adjusting, by the one or more processors, a portion of the various controls excluding the given control to compensate for loss of the feedback signal from the sensor.

12. The system of claim 1, wherein determining various variables related to the operation of the membranes further comprises:

monitoring, by the one or more processors, over time, the various variables, to determine operational trends;

predicting, based on changes in the various variables over time, future maintenance requirements for the membranes; and alerting, by the one or more processors, via an interface communicatively coupled to the one or more processors, an operator to the future maintenance requirements.

13. A system for intelligently controlling a reverse osmosis (RO) machine, the system comprising:

an RO machine, the RO machine comprising:

one or more successive stages wherein each stage comprise a plurality of membranes, wherein the plurality of membranes at each stage collectively comprise the membranes of the RO machine;

one or more pumps preceding at least the first stage, wherein the one or more pumps move feedwater, concentrate or permeate from an inlet to a stage or from each earlier stage to a later stage of the one or more successive stages;

one or more valves fluidically coupled to a portion of the plurality of membranes of each stage, the one or more valves controlling various controls within the RO system;

inlet for feedwater; and outlets for concentrate and permeate, produced by the RO machine from the feedwater; and a computer system communicatively coupled to the RO machine, the computer system comprising:

a memory;

one or more sensors dispersed throughout the RO machine, a portion of the sensors comprising one or more measurement devices; and one or more processors in communication with the memory and with the one or more sensors, wherein the computer system is configured to perform a method, the method comprising:

determining, by the one or more processors, various variables related to the operation of the membranes, the determining comprising:

measuring, by the one or more processors, over time, variables comprising operating limits of the membranes; and iteratively determining, by the one or more processors, based on inferring values of variables utilizing a method in a simulation, variables related to operation of the membranes, wherein the measured variables and the inferred variables comprise the variables, wherein the iteratively determining comprises applying an iterative mathematical model to determine a portion of the inferred variables, wherein the portion comprises one or more critical variables that cannot be measured directly;

determining, by the one or more processors, based on the variables, an upper limit and a lower limit for various control parameters within the RO machine, wherein the various control parameters are controlled by active components of the RO machine, wherein a control parameter of the various control parameters comprises brine discharge flow, and wherein determining the upper limit and the lower limit for the brine discharge flow comprises:

obtaining, by the one or more processors, a first set of values from the various variables impacting the upper limit for a brine discharge flow adjustment for the RO machine, wherein the first set of values comprise, a maximum inlet flow to a stage of the one or more stages, a maximum pressure drop in a single membrane of the plurality of the membranes, and a total pressure drop through the stage of the one or more successive stages;

obtaining, by the one or more processors, a second set of values from the various variables impacting the lower limit for a brine discharge flow adjustment for the RO machine, wherein the second set of values comprises a minimum outlet flow from the stage of the one or more successive stages, a maximum recovery in a single membrane of the stage of the one or more successive stages, and a maximum total dissolved solids in a brine; and determining, by the one or more processors, the brine discharge flow adjustment, wherein, based on the first set of values, a smallest upward adjustment, or a largest negative adjustment, added to a current brine discharge flow, defines the upper limit for brine discharge flow, and wherein, based on the second set of values, a largest upward adjustment, or a smallest negative adjustment, added to a current brine discharge flow, defines the lower limit for brine discharge flow; and deriving, by the one or more processors, for each of the various control parameters, an adjustment, wherein implementing the adjustment obtains optimal permeate recovery in the RO machine within the operating limits, wherein implementing the adjustment comprises setting a value.

14. The system of claim 13, wherein a control parameter of the various control parameters comprises circulation flow, wherein determining the upper limit and the lower limit for the circulation flow comprises:

determining, by the one or more processors, a circulation flow adjustment, based on a maximum flow into a stage of the one or more successive stages, a maximum pressure drop in a single membrane of the plurality of the membranes, or a maximum total pressure drop through the stage of the one or more successive stages, wherein a smallest upward adjustment, or a largest negative adjustment, added to a current circulation flow, defines the upper limit for the circulation flow;

defining, by the one or more processors, the lower limit for the circulation flow based on a minimum outlet flow from the stage of the one or more successive stages and a maximum recovery in the single membrane of the plurality of the membranes, wherein a largest upward adjustment added to the current circulation flow, defines the upper limit for circulation flow.

15. A system for intelligently controlling a reverse osmosis (RO) machine, the system comprising:

an RO machine, the RO machine comprising:

one or more successive stages wherein each stage comprise a plurality of membranes, wherein the plurality of membranes at each stage collectively comprise the membranes of the RO machine, wherein the one or more successive stages comprise two or more successive stages, and wherein the stages of the two or more successive stages each comprise one or more pressure vessels and one or more membrane modules;

one or more pumps preceding at least the first stage, wherein the one or more pumps move feedwater, concentrate or permeate from an inlet to a stage or from each earlier stage to a later stage of the one or more successive stages;

one or more valves fluidically coupled to a portion of the plurality of membranes of each stage, the one or more valves controlling various controls within the RO system;

the inlet for feedwater; and outlets for concentrate and permeate, produced by the RO machine from the feedwater; and a computer system communicatively coupled to the RO machine, the computer system comprising:

a memory;

one or more sensors dispersed throughout the RO machine, a portion of the sensors comprising one or more measurement devices; and one or more processors in communication with the memory and with the one or more sensors, wherein the computer system is configured to perform a method, the method comprising:

determining, by the one or more processors, various variables related to the operation of the membranes, the determining comprising:

measuring, by the one or more processors, over time, variables comprising operating limits of the membranes; and iteratively determining, by the one or more processors, based on inferring values of variables utilizing a method in a simulation, variables related to operation of the membranes, wherein the measured variables and the inferred variables comprise the variables, wherein the iteratively determining comprises applying an iterative mathematical model to determine a portion of the inferred variables, wherein the portion comprises one or more critical variables that cannot be measured directly;

determining, by the one or more processors, based on the variables, an upper limit and a lower limit for various control parameters within the RO machine, wherein the various control parameters are controlled by active components of the RO machine, and wherein a control parameters of the various control parameters are selected from the group consisting of: prior stage permeate pressure and interstage booster pressure; and deriving, by the one or more processors, for each of the various control parameters, an adjustment, wherein implementing the adjustment obtains optimal permeate recovery in the RO machine within the operating limits, wherein implementing the adjustment comprises setting a value, wherein when the control parameter comprises the prior stage permeate pressure, and wherein determining an adjustment to the prior stage permeate pressure comprises:

determining, by the one or more processors, a value for the prior stage permeate pressure, wherein the value for the prior stage permeate is equal to an immediate successive stage permeate pressure plus half of a pressure drop through the prior stage plus a difference in osmotic pressure of the two stages plus an accumulated percent difference between a maximum membrane flux at the prior stage and maximum membrane flux at the immediate successive stage; and automatically adjusting, by the one or more processors, the prior stage permeate pressure to the determined value for the prior stage permeate pressure; and wherein when the control parameter comprises the interstage booster pressure, determining an adjustment to the interstage booster pressure comprises:

determining, by the one or more processors, a value for interstage booster pressure, wherein the value for the interstage booster pressure is equal to half of a pressure drop through the two stages plus a difference in osmotic pressure of the two stages plus an accumulated percent difference between maximum membrane flux of a first stage of the two stages and maximum membrane flux of the second stage of the two stages; and automatically adjusting, by the one or more processors, the interstage booster pressure to the determined value for the interstage booster pressure.

16. A computer-implemented method for intelligently controlling a reverse osmosis (RO) machine, the method comprising:

determining, by one or more processors, various variables related to operation of membranes of a RO machine, the determining comprising:

measuring, by the one or more processors, over time, variables comprising operating limits of the membranes; and iteratively determining, by the one or more processors, based on inferring values of variables utilizing a method in a simulation, variables related to operation of the membranes, wherein the measured variables and the inferred variables comprise the variables, wherein the iteratively determining comprises applying an iterative mathematical model to determine a portion of the inferred variables, wherein the portion comprises one or more critical variables that cannot be measured directly;

determining, by the one or more processors, based on the variables, an upper limit and a lower limit for various control parameters within the RO machine, wherein the various control parameters are controlled by active components of the RO machine;

deriving, by the one or more processors, for each of the various control parameters, an adjustment, wherein implementing the adjustment obtains optimal permeate recovery in the RO machine within the operating limits, and wherein implementing the adjustment comprises setting a value;

obtaining, by the one or more processors, iteratively, over time, from one or more components comprising RO system, a response to change in feed pressure;

generating, by the one or more processors, based on the response, one or more response gradients;

determining, by the one or more processors, based on the one or more response gradients, values comprising pump speeds for one or more pumps and valve positions for one or more valves to obtain a pre-determined performance from the RO system;

determining, by the one or more processors, a time interval in which the RO machine will adjust feed pressure, wherein the feed pressure is a control parameter of the various control parameters, the determining comprising:

obtaining, by the one or more processors, via an interface, a command to trigger an evaluation of a step change response to feed pressure in the RO machine for measurements in the RO machine obtained by one or more measurement devices;

confirming, by the one or more processors, that the RO machine is operating within pre-determined operating parameters, based on the operating limits of the membranes;

based on the confirming, implementing, commencing, by the one or more processors, the step change sequence, wherein the step change sequence comprises facilitating a step change in feed pressure, while maintaining other control parameters of the various control parameters;

monitoring, by the one or more processors, the RO machine until the measured variables reach new consistent values, wherein the monitoring comprises recording intermittent values for the variables during the monitoring;

determining, by the one or more processors, a time period for each variable a tau for each variable;

multiplying, by the one or more processors, a largest tau of the taus for each variable by a static value to determine the time interval; and resuming, by the one or more processors, regular operation of the RO machine.

* * * * *